US012676132B2

(12) United States Patent
Akiyama et al.

(10) Patent No.: US 12,676,132 B2
(45) Date of Patent: Jul. 7, 2026

(54) VIBRATION DEVICE AND SOUND INSULATION DEVICE

(71) Applicant: AGC Inc., Tokyo (JP)

(72) Inventors: Jun Akiyama, Tokyo (JP); Kento Sakurai, Tokyo (JP); Daisuke Uchida, Tokyo (JP); Ken Fujita, Tokyo (JP)

(73) Assignee: AGC INC., Tokyo (JP)

( * ) Notice: Subject to any disclaimer, the term of this patent is extended or adjusted under 35 U.S.C. 154(b) by 259 days.

(21) Appl. No.: 18/510,329

(22) Filed: Nov. 15, 2023

(65) Prior Publication Data

US 2024/0096305 A1 Mar. 21, 2024

Related U.S. Application Data

(63) Continuation of application No. PCT/JP2022/020444, filed on May 16, 2022.

(30) Foreign Application Priority Data

May 19, 2021 (JP) ................................. 2021-084927

(51) Int. Cl.
*G10K 11/00* (2006.01)
*B32B 17/10* (2006.01)

(52) U.S. Cl.
CPC ...... *G10K 11/002* (2013.01); *B32B 17/10036* (2013.01); *B32B 17/10165* (2013.01); *B32B 17/10761* (2013.01); *B32B 2307/102* (2013.01); *B32B 2307/304* (2013.01); *B32B 2605/00* (2013.01)

(58) Field of Classification Search
CPC ............ G10K 11/002; B32B 2307/304; B32B 2307/102; B32B 17/10761; B32B 17/10165; B32B 17/10036
See application file for complete search history.

(56) References Cited

U.S. PATENT DOCUMENTS 10,809,424 B2 * 10/2020 Kawai .................... G10K 13/00
11,122,370 B2   9/2021 Akiyama et al.
12,342,142 B2 *  6/2025 Kim ....................... H04R 1/406
(Continued)

FOREIGN PATENT DOCUMENTS

JP    H05-310450 A    11/1993
JP    2009-100223 A    5/2009
(Continued)

OTHER PUBLICATIONS

International Searching Authority, "International Search Report," issued in connection with International Patent Application No. PCT/JP2022/020444, dated Jul. 19, 2022.
(Continued)

*Primary Examiner* — Forrest M Phillips
(74) *Attorney, Agent, or Firm* — Foley & Lardner LLP

(57) ABSTRACT

A vibration device includes: a glass vibration plate including a plurality of glass plates being laminated, and a solid-phase intermediate layer between at least a pair of the glass plates among the glass plates; a vibrator fixed to the glass vibration plate and configured to vibrate the glass vibration plate, in which the glass vibration plate includes a temperature adjustment unit configured to adjust a temperature of the intermediate layer.

21 Claims, 25 Drawing Sheets

(56) References Cited

U.S. PATENT DOCUMENTS

| | | | |
|---|---|---|---|
| 2001/0009207 A1* | 7/2001 | Faulhaber | F16L 55/033 |
| | | | 181/224 |
| 2007/0238835 A1* | 10/2007 | Chen | C08L 53/025 |
| | | | 525/240 |
| 2013/0251176 A1 | 9/2013 | Goto et al. | |
| 2017/0341347 A1 | 11/2017 | Nakamura | |
| 2019/0030862 A1 | 1/2019 | Akiyama | |
| 2020/0021916 A1 | 1/2020 | Akiyama et al. | |
| 2020/0223187 A1 | 7/2020 | Sakurai et al. | |
| 2020/0230922 A1 | 7/2020 | Sakurai et al. | |
| 2020/0233455 A1 | 7/2020 | Sakurai et al. | |
| 2020/0238665 A1 | 7/2020 | Sakurai et al. | |
| 2020/0332518 A1 | 10/2020 | Komoto et al. | |
| 2020/0404412 A1 | 12/2020 | Akiyama et al. | |
| 2021/0268775 A1 | 9/2021 | Miyamoto et al. | |
| 2021/0314706 A1 | 10/2021 | Akiyama et al. | |
| 2022/0153177 A1* | 5/2022 | Jadhav | H04R 29/004 |
| 2022/0217470 A1 | 7/2022 | Akiyama et al. | |
| 2022/0388282 A1* | 12/2022 | Mannheim Astete | |
| | | | B32B 38/105 |
| 2023/0347626 A1* | 11/2023 | Gima | B32B 17/10504 |
| 2025/0227408 A1* | 7/2025 | Sakurai | H04R 1/02 |

FOREIGN PATENT DOCUMENTS

| | | | |
|---|---|---|---|
| JP | 2014-034486 A | 2/2014 | |
| JP | 2017-214274 A | 12/2017 | |
| WO | WO-2019/103017 A1 | 5/2019 | |
| WO | WO-2019/172076 A1 | 9/2019 | |
| WO | WO-2020/012783 A1 | 1/2020 | |
| WO | WO-2021/060214 A1 | 4/2021 | |

OTHER PUBLICATIONS

International Searching Authority, "Written Opinion," issued in connection with International Patent Application No. PCT/JP2022/020444, dated Jul. 19, 2022.

* cited by examiner

FREQUENCY [Hz]

SENSOR OUTPUT

VIBRATION DEVICE AND SOUND INSULATION DEVICE

CROSS-REFERENCE TO RELATED APPLICATIONS

This is a bypass continuation of International Patent Application No. PCT/JP2022/020444, filed on May 16, 2022, which claims priority to Japanese Patent Application No. 2021-084927, filed on May 19, 2021. The contents of these applications are hereby incorporated by reference in their entireties.

TECHNICAL FIELD

The present invention relates to a vibration device and a sound insulation device.

BACKGROUND ART

A technique for improving acoustic characteristics by vibrating a glass plate is known (Patent Literature 1).

A speaker device described in Patent Literature 1 includes a vibration plate having optical transparency (for example, a glass plate and light-transmissive ceramics), an exciter (excitation apparatus) that generates vibration, and a vibration transmission portion that is connected to the vibration plate and the exciter and transmits the vibration from the exciter to the vibration plate. A loss coefficient at 25° C. of the vibration plate is $1\times10^{-2}$ or more, a specific elastic modulus of the vibration transmission portion is 20 mm²/s² or more, and excellent designability is exhibited without impairing the design of the vibration plate while maintaining the acoustic performance.

Patent Literature 1: WO2019/172076

SUMMARY OF INVENTION

Patent Literature 1 discloses that the speaker device described in Patent Literature 1 includes an intermediate layer provided between a pair of substrates (for example, glass plates), a high loss coefficient can be achieved when the intermediate layer is liquid, and better vibration transmission can be obtained when a thickness is reduced. However, Patent Literature 1 does not disclose about acoustic characteristics due to a change in ambient temperature regarding the speaker device described in Patent Literature 1. For example, when the speaker device is used as a vibration (sound) generation unit of a sound insulation device, if the speaker device is provided between the interior and the exterior of a vehicle or a building, a sufficient sound insulation effect may not be obtained depending on an outside air temperature.

This is because vibration frequency characteristics of the vibration plate have temperature dependency. In particular, when the temperature is low, a damping performance decreases, the vibration plate tends to resonate, and a desired performance cannot be obtained.

Therefore, an object of the present invention is to provide a vibration device and a sound insulation device capable of stably exhibiting necessary vibration characteristics by reducing a change in acoustic characteristics according to a change in temperature of a glass vibration plate.

The present invention has the following configuration.

(1) A vibration device including:

a glass vibration plate including a plurality of glass plates being laminated, and a solid-phase intermediate layer between at least a pair of the glass plates among the glass plates;

a vibrator fixed to the glass vibration plate and configured to vibrate the glass vibration plate; and an enclosure member configured to define an internal space surrounding the vibrator fixed to the glass vibration plate and cause one end of the glass vibration plate to be exposed outside the internal space from an opening of the internal space, in which the glass vibration plate includes a temperature adjustment unit configured to adjust a temperature of the intermediate layer.

(2) A sound insulation device including:

the vibration device according to (1), the vibration device being disposed at a boundary between an interior space and an exterior;

an exterior sound detection unit configured to detect a sound from a noise source or a vibration source that is correlated with a sound wave vibration induced in the glass vibration plate, and output a reference signal according to a detection result;

an interior sound detection unit configured to detect a sound in the interior space and output an error signal according to a detection result; and a control unit configured to cause the vibrator to output a cancellation signal having a phase opposite to a phase of the reference signal.

According to the present invention, it is possible to stably exhibit necessary vibration characteristics by reducing a change in acoustic characteristics of the vibration plate according to a change in temperature of the glass vibration plate.

DESCRIPTION OF EMBODIMENTS

Hereinafter, a configuration example of the present invention will be described in detail with reference to the drawings.

The present invention is a vibration device having a function of a speaker that generates a sound by vibrating a glass vibration plate, and here, as an example, a case in which the present invention is applied to a sound insulation device that reduces the propagation of exterior noise into the interior will be described. However, a use purpose of the vibration device is not limited thereto, and the vibration device can also be applied to other applications. In addition, an aspect in which the glass vibration plate is applied to a window of a vehicle or a window of a housing will be described, and an application target of the glass vibration plate is not limited thereto.

Figure 1:
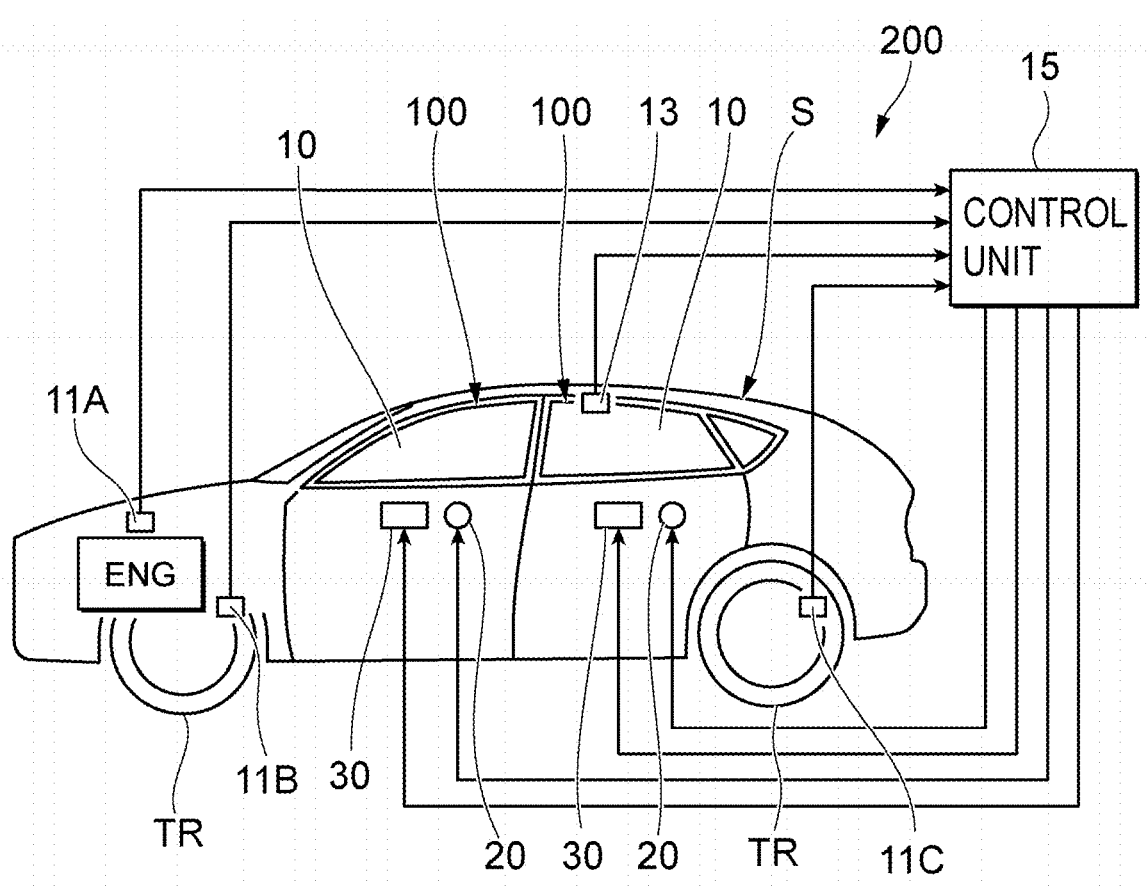
FIG. 1 is a schematic block diagram of a sound insulation device in which a vibration device is applied to a sound insulation device of a vehicle.

FIG. 1 is a schematic block diagram of the sound insulation device in which the vibration device is applied to the sound insulation device of the vehicle.

A sound insulation device 200 includes a plurality of vibration devices 100 each constituted by using a glass vibration plate 10 as a window of a vehicle S, a plurality of exterior sound detection units 11 (11A, 11B, and 11C) to be described in detail later, an interior sound detection unit 13, and a control unit 15.

Figure 2:
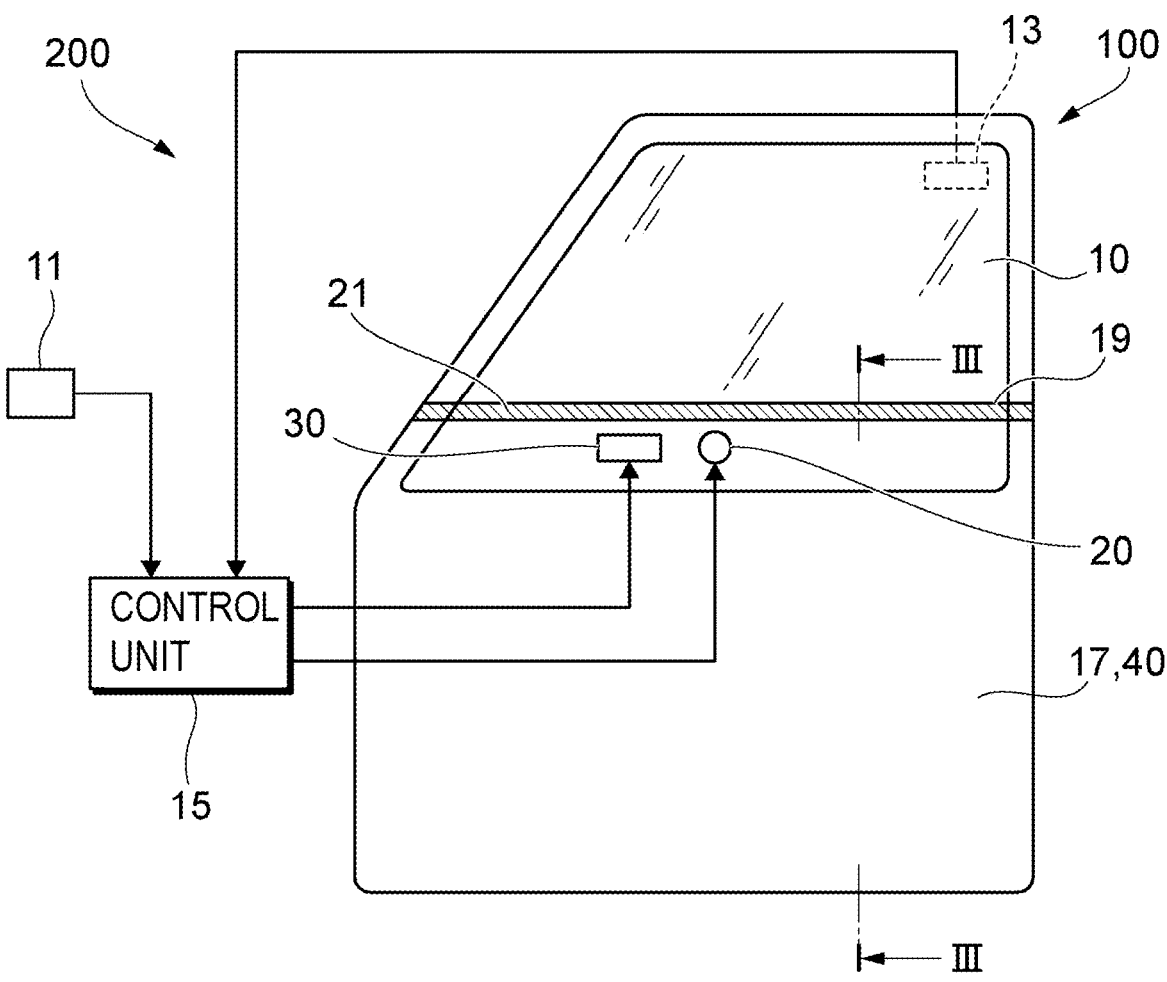
FIG. 2 is a schematic diagram of one vibration device provided on a vehicle door.

FIG. 2 is a schematic diagram of one vibration device 100 provided on a door of the vehicle S.

The vibration device 100 includes the glass vibration plate 10, a vibrator 20 attached to the glass vibration plate 10, and a temperature adjustment unit 30 that adjusts a temperature of the glass vibration plate 10. The glass vibration plate 10 is supported by a door panel 17 serving as a window frame so as to be freely raised and lowered.

Figure 3:
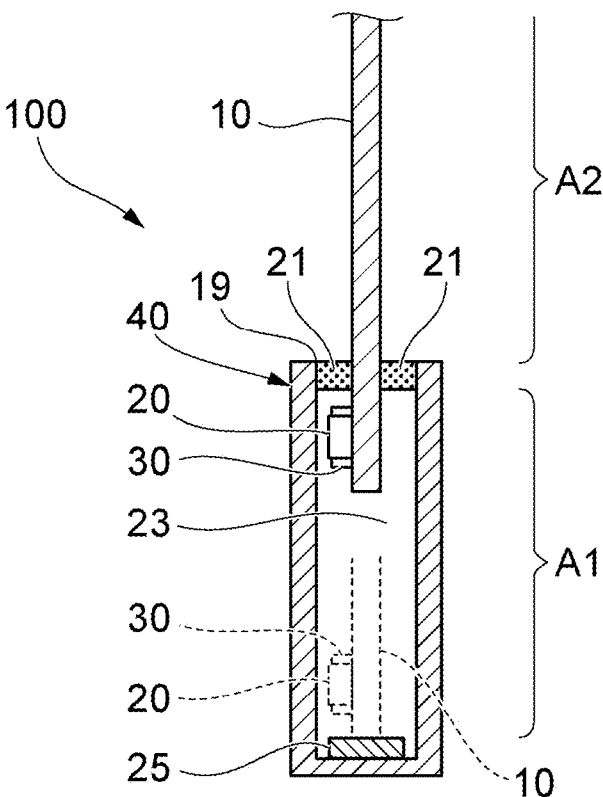
FIG. 3 is a schematic cross-sectional view taken along a line illustrated in FIG. 2.

FIG. 3 is a schematic cross-sectional view taken along a line illustrated in FIG. 2.

The door panel 17 includes an enclosure member 40 that accommodates a part of the glass vibration plate 10. The enclosure member 40 may be a part of the door panel 17 or the entire door panel 17. The enclosure member 40 includes an opening 19, and causes the glass vibration plate 10 to protrude from the opening 19. At least one of, preferably, a plurality of vibrators 20 are attached to the glass vibration plate 10.

The glass vibration plate 10 is excited by the vibration generated by the vibrator 20 to generate a sound. The vibrator 20 is fixed to the glass vibration plate 10 and vibrates the glass vibration plate 10 according to an input drive signal. The glass vibration plate 10 is a laminated structure, and the details will be described later. An intermediate layer (to be described later) is provided between at least a pair of glass vibration plates 10. The glass vibration plate 10 has an outer shape that matches a window shape of the vehicle S, and the shape is not limited thereto. In addition, the glass vibration plate 10 itself may have a light-transmitting property and be seen through, and may have a light-shielding property or a selective optical transparency such as an optical filter such as a band-pass filter or a surface treatment layer whose surface is formed as a light diffusion surface.

The vibrator 20 is, for example, an actuator such as a voice coil motor, and includes a coil unit, a magnetic circuit unit, and an excitation unit coupled to the coil unit or the magnetic circuit unit. When a drive signal from the control unit 15 is input to the coil unit of the vibrator 20, vibration occurs in the coil unit or the magnetic circuit unit due to an interaction between the coil unit and the magnetic circuit unit. The vibration of the coil unit or the magnetic circuit unit is transmitted to the excitation unit, and is transmitted from the excitation unit to the glass vibration plate 10. Accordingly, a sound is generated from the glass vibration plate 10.

The temperature adjustment unit 30 includes a heating body that adjusts a temperature of the intermediate layer of the glass vibration plate 10 or a structure having a heat retention function. The temperature adjustment unit 30 may be provided on one side surface or both surfaces of the glass vibration plate 10. The temperature adjustment unit 30 may perform heating, cooling, heat-retention, and the like of the intermediate layer according to a command signal from the control unit 15 based on a temperature of the glass vibration plate 10, a surrounding member, or an environmental atmosphere detected by a sensor unit (not illustrated).

As the sensor unit that detects a temperature, a contact temperature sensor or a non-contact temperature sensor can be used. Examples of the contact temperature sensor include a thermistor, a thermocouple, a resistance temperature detector, and an IC temperature sensor, and examples of the non-contact temperature sensor include an infrared sensor. In addition, the sensor unit may be mounted on a surface of the glass vibration plate 10, or may be embedded into a groove (recess) or a hole formed in a portion of the glass vibration plate 10. In addition, the sensor unit may be embedded inside the intermediate layer of the glass vibration plate 10, may be embedded in an interface between the intermediate layer and the glass plate, or may be integrated with the vibrator 20. Further, the sensor unit may be disposed in the enclosure member 40 or the door panel 17, and the temperature of the glass vibration plate 10 may be derived by the control unit 15 based on a temperature measured by an out-vehicle temperature meter or an in-vehicle temperature meter provided as a sensor unit.

The enclosure member 40 is formed in a box shape surrounding a portion of the glass vibration plate 10 in which the vibrator 20 and the temperature adjustment unit 30 are disposed. A shielding member 21 is provided in the opening 19 of the enclosure member 40. The shielding member 21 makes an internal space 23 of the enclosure member 40 a closed space, and acoustically shields a space between the opening 19 and the glass vibration plate 10. In addition, the glass vibration plate 10 is divided into an excitation region A1 in which the vibrator 20 is provided inside the internal space 23 and a vibration region A2 outside the internal space 23. The closed space herein means a space in which the magnitude of the sound differs when a sound inside the internal space 23 propagates to the outside of the enclosure member 40 through the opening 19 in a case in which the shielding member 21 is disposed in the opening 19 and in a case in which the shielding member 21 is not disposed in the opening 19. Specifically, the closed space means at least a space that may have an acoustic shielding effect by the shielding member 21 between the opening 19 and the glass vibration plate 10 even when there is a gap or the like other than the opening 19 of the enclosure member 40.

In other words, the excitation region A1 can be a region of a plate surface of the glass vibration plate 10 excluding a portion exposed to the outside from the internal space 23 of the enclosure member 40. That is, the enclosure member 40 causes one end of the glass vibration plate 10 to be exposed outside the internal space 23 from the opening 19 of the internal space 23. Here, the term "one end of the glass vibration plate 10" refers to an end of the glass vibration plate 10 farther from fixed positions of the vibrator 20 and the temperature adjustment unit 30 in an end of the glass vibration plate 10 closer to the fixed positions of the vibrator 20 and the temperature adjustment unit 30 and the end of the glass vibration plate 10 farther from the fixed positions of the vibrator 20 and the temperature adjustment unit 30.

As the shielding member 21, a hydrocarbon composition, a silicone composition, a general polymeric material which is a fluorine-containing composition, and general rubber can be used. However, a material having a storage elastic modulus G of $1.0 \times 10^2$ Pa to $1.0 \times 10^{10}$ Pa when a dynamic viscoelasticity of a sheet molded to a thickness of 1 mm is measured at 25° C., a frequency of 1 Hz, and a compression mode is preferred, and a material having a storage elastic modulus G of $1.0 \times 10^3$ Pa to $1.0 \times 10^8$ Pa is more preferred. The "shielding" by the shielding member 21 refers to a state in which the shielding member 21 is in contact with the glass vibration plate 10 to allow a fine movement in a micrometer unit without completely fixing the glass vibration plate 10. Accordingly, a sound leakage from the internal space 23 is prevented.

A support member 25 that protects a lower side of the glass vibration plate 10 may be provided on a bottom surface of the internal space 23. As the support member 25, for example, an elastic sheet having cushioning properties such as rubber, felt, and sponge can be used.

Although the details are omitted, the enclosure member 40 of the present configuration can raise and lower the glass vibration plate 10 by a driving mechanism (not illustrated). By raising and lowering the glass vibration plate 10, the window of the vehicle S illustrated in FIGS. 1 and 2 can be freely opened and closed. Therefore, when the window is closed by the glass vibration plate 10, the interior and the exterior are partitioned, and a sound insulation effect in the interior is obtained by the vibration of the glass vibration plate 10 to be described later.

The exterior sound detection unit 11 illustrated in FIG. 1 is, for example, a microphone. The exterior sound detection unit 11 detects a sound from a noise source or a vibration source which is correlated with a sound wave vibration induced in the glass vibration plate 10, and outputs a reference signal according to a detection result. Specifically, an exterior sound detection unit 11A is provided in an engine room and detects noise emitted from an engine ENG. An exterior sound detection unit 11B is provided in a front-wheel tire house and detects noise such as road noise from a front-wheel tire TR. Similarly, an exterior sound detection unit 11C detects noise from a rear-wheel tire TR.

Each of the signals of the sounds detected by the exterior sound detection unit 11 is transmitted to the control unit 15 as the reference signal. The exterior sound detection unit 11 may be a vibration sensor, an optical sensor, or the like that detects the number of revolutions of the engine ENG or the tires, and in this case, information on the number of revolutions is transmitted from the exterior sound detection unit 11 to the control unit 15 as the reference signal.

The interior sound detection unit 13 is, for example, a microphone, is provided inside the vehicle S, and detects the interior sound. The interior sound detection unit 13 is preferably disposed in the vicinity of the glass vibration plate 10 and an ear of an occupant in the interior. A signal of the sound detected by the interior sound detection unit 13 is transmitted to the control unit 15 as an error signal.

The vibration from the vibrator 20 propagates from the excitation region A1 to the vibration region A2, and is acoustically radiated from the vibration region A2. In this case, in the internal space 23 of the enclosure member 40, the space between the opening 19 and the glass vibration plate 10 is acoustically shielded by the shielding member 21, and thus a sound generated from the excitation region A1 is attenuated in the internal space 23. Therefore, the sound from the excitation region A1 is less likely to leak to the outside of the internal space 23.

Sound Insulation Control

Figure 4:
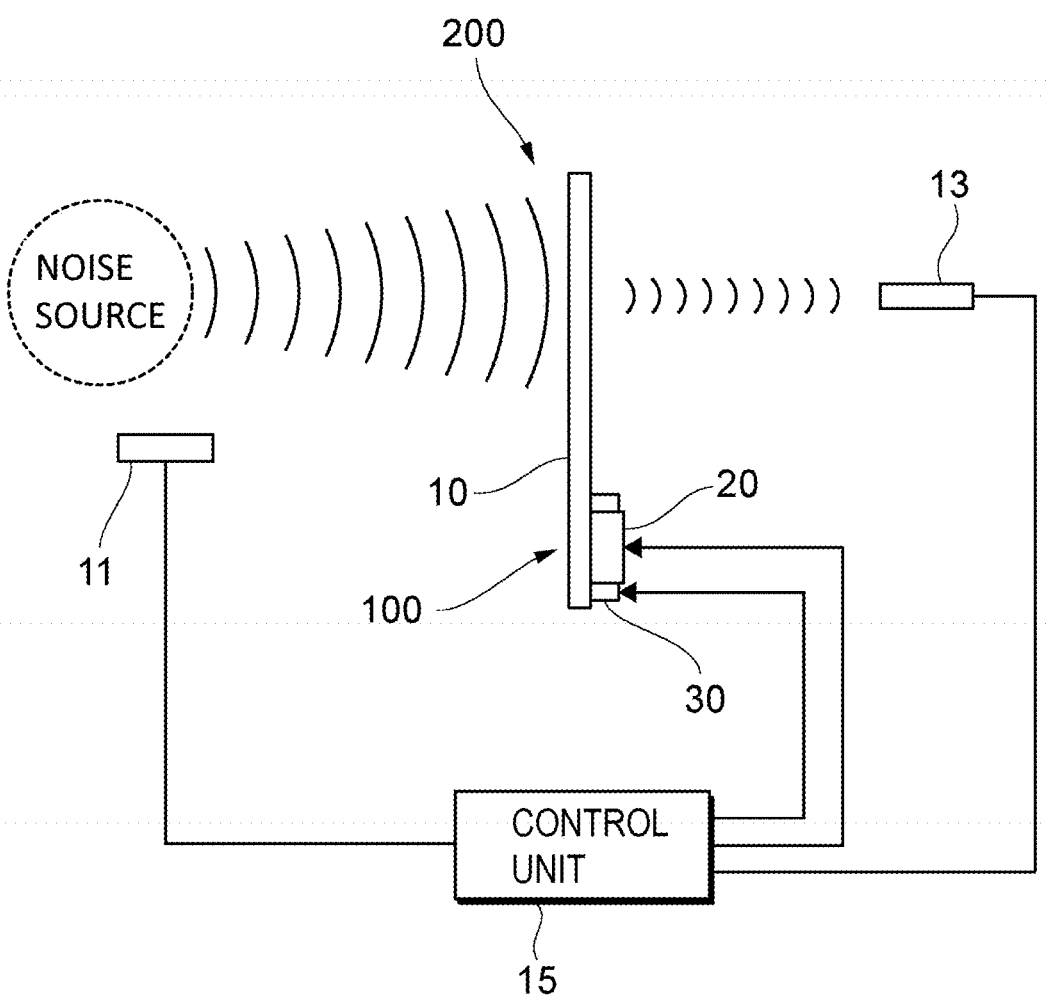
FIG. 4 is a functional block diagram of a sound insulation device applied to a vehicle.

FIG. 4 is a functional block diagram of the sound insulation device applied to the vehicle S. The control of the sound insulation device will be described with reference to FIG. 4.

The control unit 15 is constituted by a microcomputer including a processor such as a CPU, a memory such as a ROM and a RAM, and a storage. The exterior sound detection unit 11 detects noise from the noise source, such as the sound of the engine ENG and the road noise from the tire TR, and a detection result of the noise is transmitted to the control unit 15 as a reference signal. In addition, the interior sound detection unit 13 detects an interior sound, and a detection result of the interior sound is transmitted to the control unit 15 as an error signal.

Based on a transfer function, the control unit 15 synchronizes a phase of the reference signal from the exterior sound detection unit 11 with a phase of the error signal from the interior sound detection unit 13 to generate a cancellation signal having a phase opposite to that of the reference signal. The cancellation signal minimizes the error signal. The control unit 15 amplifies the generated cancellation signal and outputs the amplified cancellation signal to the vibrator 20 to vibrate the vibrator 20.

The vibrator 20 generates vibration corresponding to the transmitted cancellation signal to vibrate the glass vibration plate 10 to which the vibrator 20 is attached. Therefore, the vibration generated in the glass vibration plate 10 due to exterior noise is cancelled out by the vibration caused by the vibrator 20, and the transmission of the noise from the exterior to the interior is reduced.

Configuration of Glass Vibration Plate

Next, the configuration of the glass vibration plate 10 used in the vibration device 100 will be described.

Figure 5:
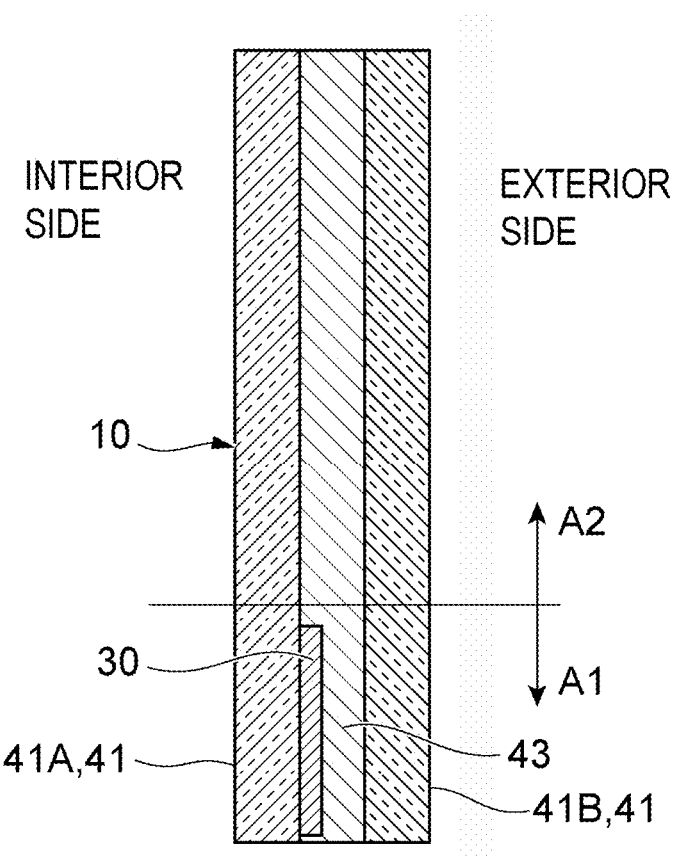
FIG. 5 is a schematic cross-sectional view illustrating a configuration of a glass vibration plate.

FIG. 5 is a schematic cross-sectional view illustrating the configuration of the glass vibration plate 10.

In the glass vibration plate 10, a first glass plate 41A and a second glass plate 41B are arranged to face each other, and an intermediate layer 43 is provided between the first glass plate 41A and the second glass plate 41B. Here, it is assumed that the first glass plate 41A is disposed on an interior side of the vehicle S illustrated in FIG. 1 and the second glass plate 41B is disposed on an exterior side of the vehicle S illustrated in FIG. 1.

The first glass plate 41A and the second glass plate 41B are preferably made of a material having a high longitudinal wave sound velocity value, and for example, is made of a material such as a glass, light-transmissive ceramics, and a single crystal such as sapphire. Hereinafter, the first glass plate 41A and the second glass plate 41B are also referred to as a pair of glass plates 41 or simply as glass plate(s) 41.

The intermediate layer 43 of the glass vibration plate 10 prevents the resonance of the glass plates 41 or attenuates the vibration caused by the resonance of the glass plates 41 when the glass plates 41 resonate due to the driving of the vibrator 20. With the presence of the intermediate layer 43, the glass vibration plate 10 can increase the loss coefficient as compared with a case in which only the glass plates 41 are used.

In the glass plate 41 applied to the glass vibration plate 10, the larger the loss coefficient is, the more preferable it is, since the vibration damping becomes larger. The loss coefficient of the glass plate 41 at 25° C. is preferably $1\times10^{-3}$ or more, more preferably $2\times10^{-3}$ or more, and still more preferably $5\times10^{-3}$ or more. In addition, a longitudinal wave sound velocity value in a plate thickness direction of the glass plate 41 is preferably $4.0\times10^3$ m/s or more, more preferably $4.5\times10^3$ m/s or more, and still more preferably $5.0\times10^3$ m/s or more, since the higher a sound velocity is, the more the reproducibility of a high-frequency sound is improved when the vibration plate is formed. An upper limit is not particularly limited, and is preferably $7.0\times10^3$ m/s or less.

With the presence of the intermediate layer 43, the glass vibration plate 10 obtains a high loss coefficient and a high longitudinal wave sound velocity value. A large loss coefficient means a large vibration damping capacity.

As for the loss coefficient, a value calculated by a half-width method is used. Denoting f as a resonance frequency of a material and W as a frequency width at a point decreased by −3 dB from a peak value of an amplitude h, that is, a point at a maximum amplitude of −3 [dB], a value represented by $\{W/f\}$ is defined as the loss coefficient. To reduce the resonance, the loss coefficient may be increased. Here, reducing the resonance means increasing the frequency width W relative to the amplitude h and making a peak broad.

The loss coefficient is a unique value of a material or the like, and for example, in a case of a single glass plate, the loss coefficient differs depending on a composition, a relative density, or the like. The loss coefficient can be measured by a dynamic elastic modulus testing method such as a resonance method.

The longitudinal wave sound velocity value refers to a velocity at which a longitudinal wave propagates in the vibration plate. The longitudinal wave sound velocity value and the Young's modulus can be measured by an ultrasonic pulse method described in Japanese Industrial Standards (JIS-R1602-1995).

Figure 6:
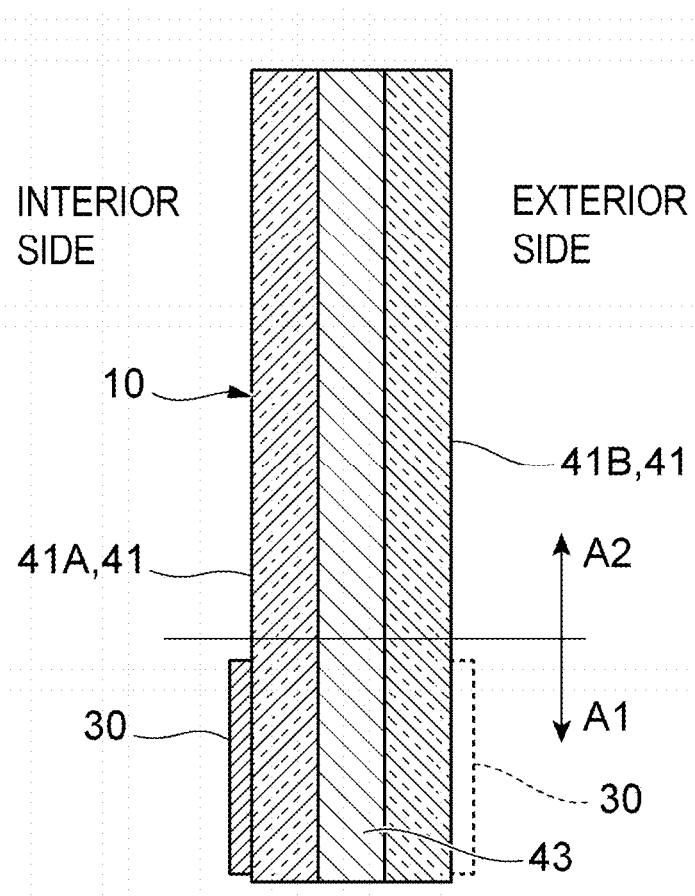
FIG. 6 is a schematic cross-sectional view of a glass vibration plate illustrating another arrangement example of a temperature adjustment unit illustrated in FIG. 5.

FIG. 6 is a schematic cross-sectional view of the glass vibration plate illustrating another arrangement example of the temperature adjustment unit illustrated in FIG. 5.

Figure 7:
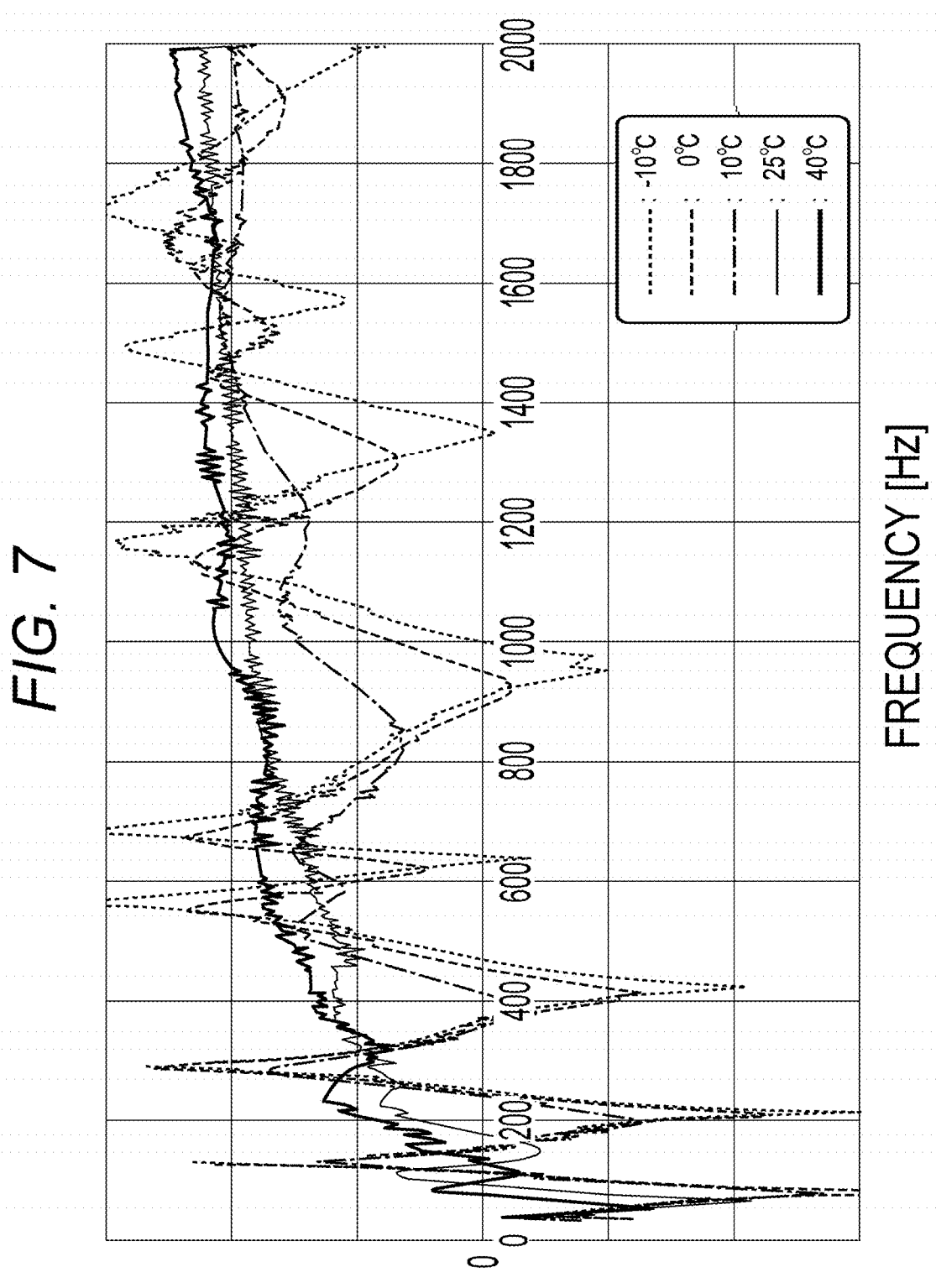
FIG. 7 is a graph illustrating a temperature dependency of frequency response characteristics of a glass vibration plate.

As illustrated in FIG. 5, the temperature adjustment unit 30 may be provided between the first glass plate 41A and the intermediate layer 43, may be provided outside the first glass plate 41A, and may be provided outside each of the first glass plate 41A and the second glass plate 41B as illustrated in FIG. 6. In addition, the temperature adjustment unit 30 may be provided in the excitation region A1, and the temperature adjustment unit 30 may be provided in both the excitation region A1 and the vibration region A2 or only in the vibration region A2. FIG. 7 is a graph illustrating a temperature dependency of frequency response characteristics of the glass vibration plate 10. The intermediate layer 43 of the glass vibration plate 10 used for evaluation is polyvinyl butyral (PVB).

In the glass vibration plate 10 illustrated in FIG. 6, when the temperature is 10° C. or lower, a damping performance decreases, and the resonance is likely to occur. In addition, when the temperature rises to the room temperature or higher (40° C. or higher), the damping performance of the intermediate layer 43 increases, and efficient excitation of the glass vibration plate 10 cannot be applied. As described above, when the temperature dependency of the frequency response characteristics is large, this leads to disturbances in a sound pressure and a phase of the generated sound, and an active control performance required in the sound insulation device 200 is significantly reduced.

Therefore, in the configuration, when the glass vibration plate 10 is excited, the temperature adjustment unit 30 is provided such that a temperature of the intermediate layer 43 is within a predetermined temperature range. For example, when an outside air temperature of the vehicle S is low, the temperature of the intermediate layer 43 is increased, and when the outside air temperature is high, the increase in the temperature of the intermediate layer 43 is reduced (or the intermediate layer 43 is being cooled). By controlling the temperature of the intermediate layer 43, the damping performance and frequency characteristics of the glass vibration plate 10 are stabilized, resulting in good sound insulation characteristics.

Each of FIGS. 8A to 8D is a diagram illustrating a temperature adjustment region F by the temperature adjustment unit 30 disposed in the glass vibration plate 10 illustrated in FIG. 2. In each of FIGS. 8A to 8D, a region (temperature adjustment region F) in which the temperature adjustment unit 30 is disposed is indicated by a hatched area, and a position at which the shielding member 21 is disposed in the opening 19 of the enclosure member 40 illustrated in FIG. 2 is indicated as a belt line BL.

Figure 8A:
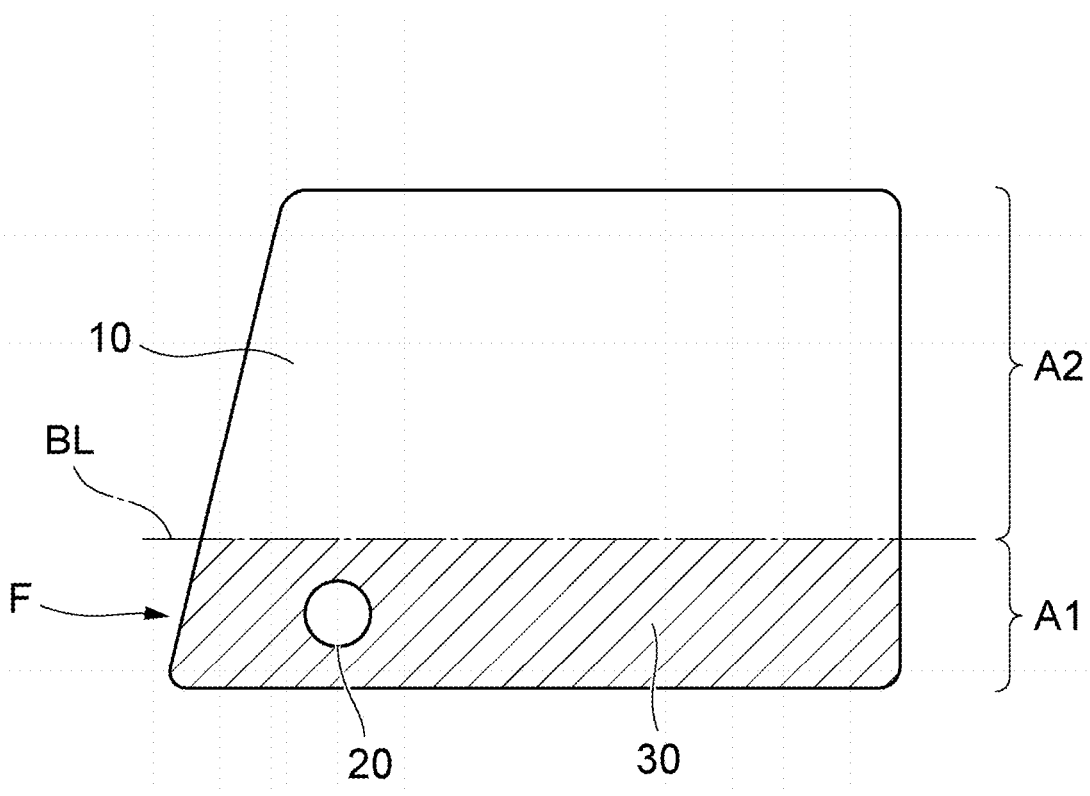
FIG. 8A is a diagram illustrating a temperature adjustment region by a temperature adjustment unit disposed in the glass vibration plate illustrated in FIG. 2.

In FIG. 8A, the temperature adjustment region F is provided below the belt line BL, that is, in the internal space 23 (see FIG. 3) of the enclosure member 40. That is, the temperature adjustment region F is provided only in an unexposed portion of the glass vibration plate 10. In this case, the temperature adjustment unit 30 is disposed in the excitation region A1, and thus vibration characteristics of the glass vibration plate 10 can be reliably improved. In addition, the temperature adjustment unit 30 is accommodated in a portion that is not exposed to the outside, and thus a user cannot visually recognize the temperature adjustment unit 30, resulting in a good designability. Further, the temperature adjustment unit 30 is protected without being exposed to an environmental atmosphere such as ultraviolet rays and heat rays due to sunlight, wind and rain. Accordingly, the deterioration of the temperature adjustment unit 30 over time is reduced.

Figure 8B:
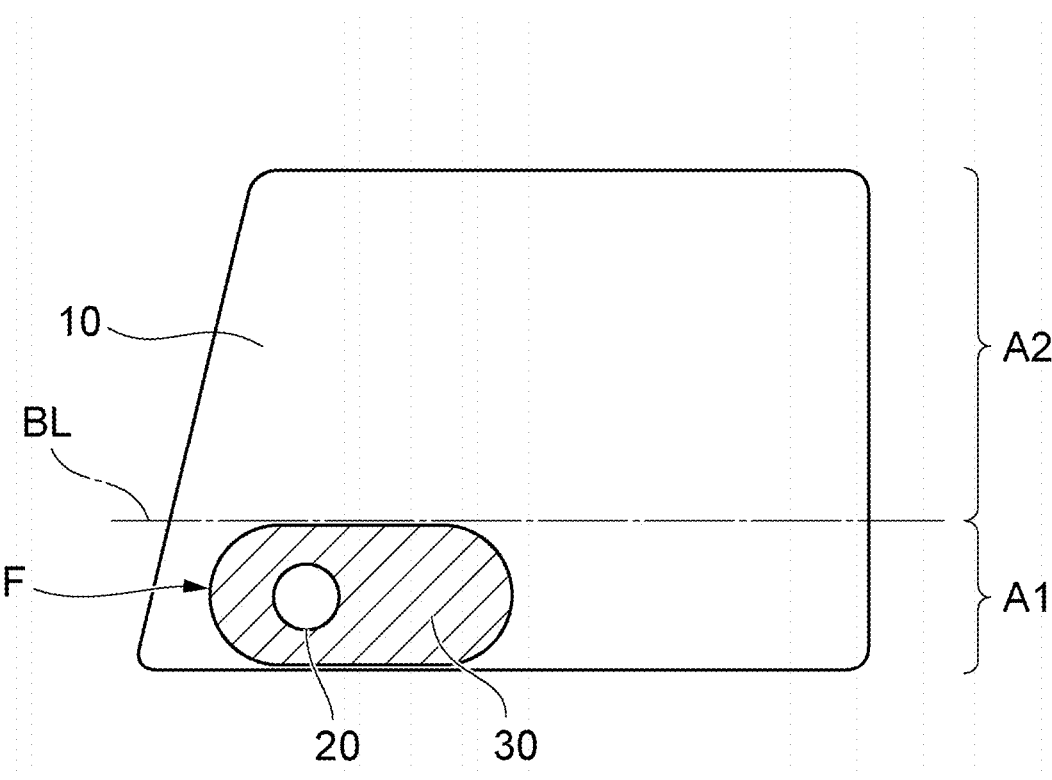
FIG. 8B is a diagram illustrating a temperature adjustment region by a temperature adjustment unit disposed in the glass vibration plate illustrated in FIG. 2.

In FIG. 8B, the temperature adjustment region F is provided only around the vibrator below the belt line BL. In this case, the temperature adjustment region F can be kept to a necessary minimum limit, and an arrangement cost of the temperature adjustment unit 30 can be reduced.

Figure 8C:
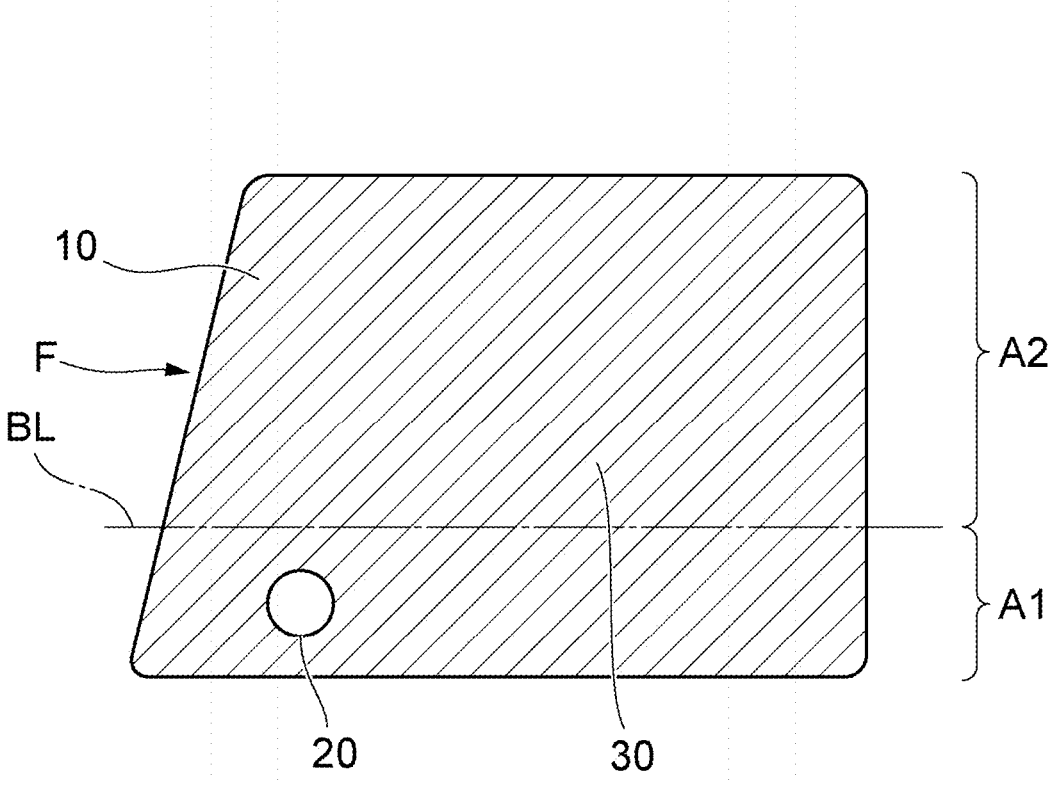
FIG. 8C is a diagram illustrating a temperature adjustment region by a temperature adjustment unit disposed in the glass vibration plate illustrated in FIG. 2.

In FIG. 8C, the temperature adjustment region F is provided in both the excitation region A1 and the vibration region A2 of the glass vibration plate 10. In this case, the entire glass vibration plate 10 can be maintained at an appropriate temperature, and the vibration characteristics can be kept good.

Figure 8D:
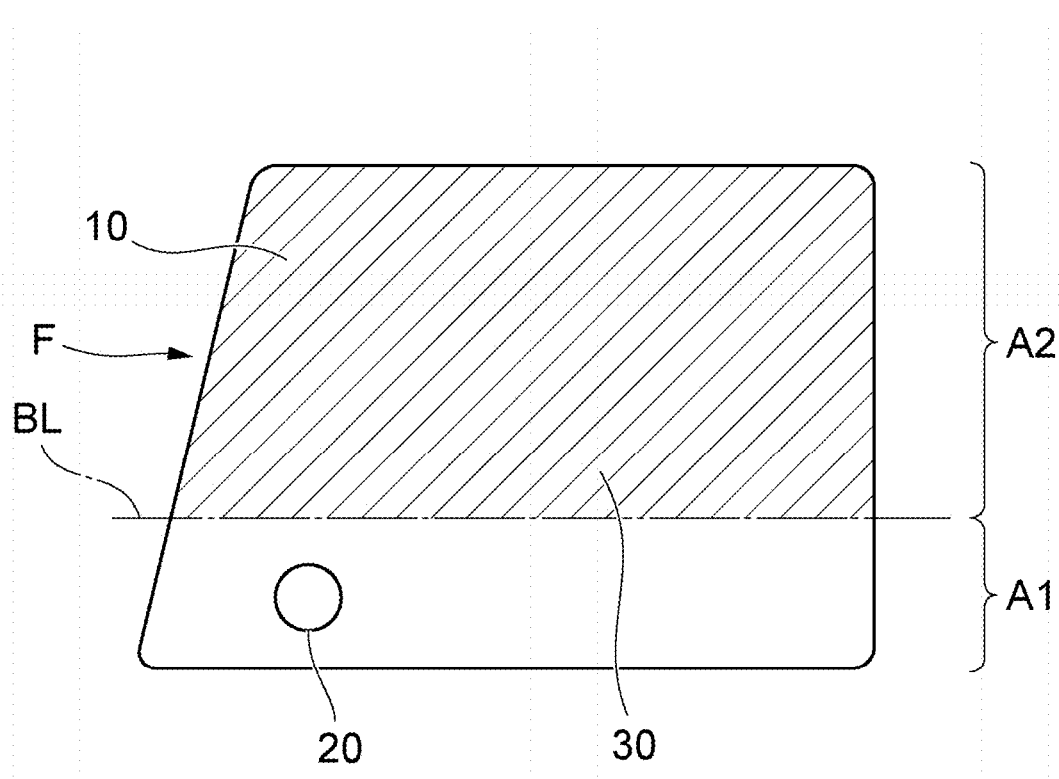
FIG. 8D is a diagram illustrating a temperature adjustment region by a temperature adjustment unit disposed in the glass vibration plate illustrated in FIG. 2.

In FIG. 8D, the temperature adjustment region F is provided only in an exposed portion above the belt line BL of the glass vibration plate 10. In this case, the vibration characteristics of the vibration region A2 become good.

As described above, the temperature adjustment region F can be appropriately selected depending on a purpose of use, a performance, a sound insulation property, and the like.

Figure 9A:
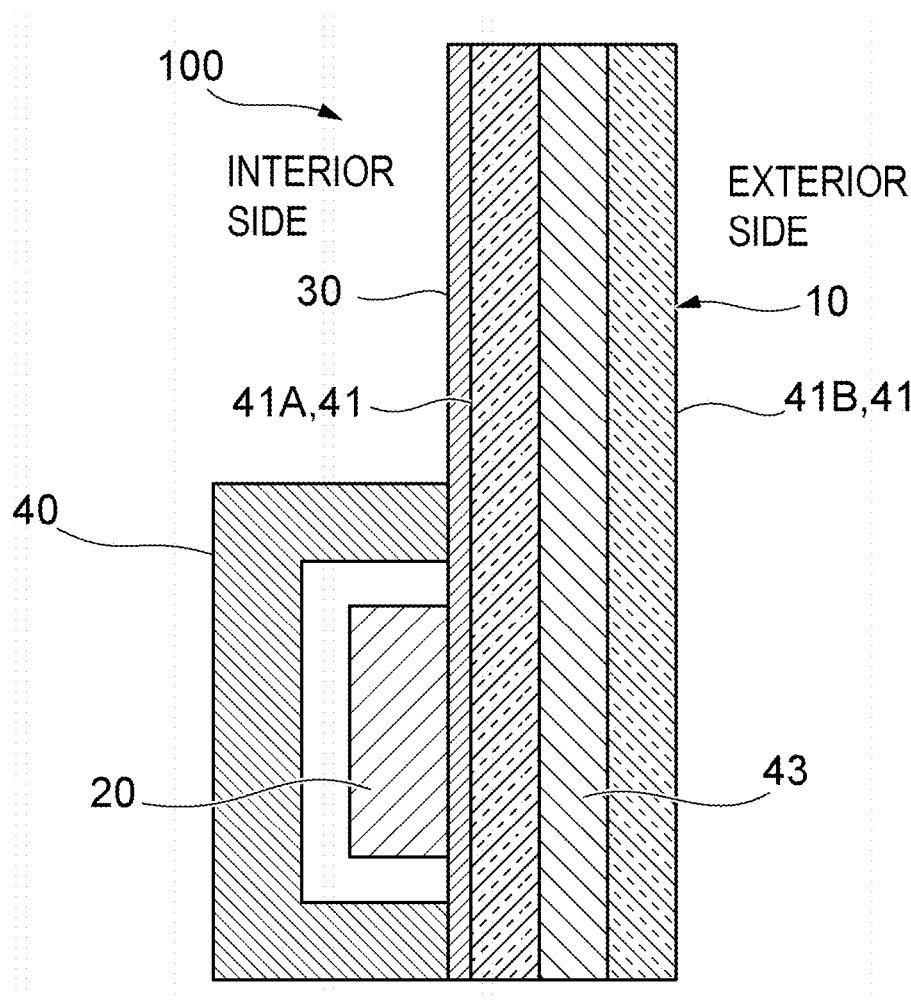
FIG. 9A is a schematic cross-sectional view illustrating a configuration of a glass vibration plate.
Figure 9B:
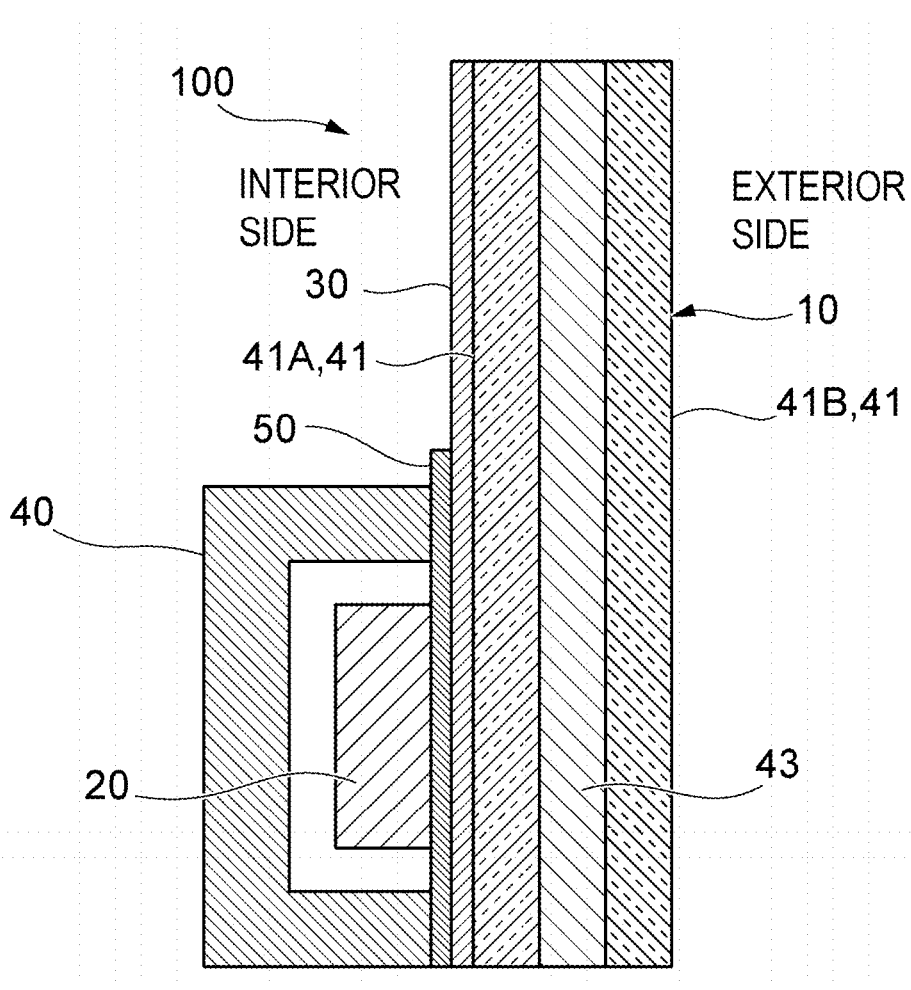
FIG. 9B is a schematic cross-sectional view illustrating a configuration of a glass vibration plate.
Figure 9C:
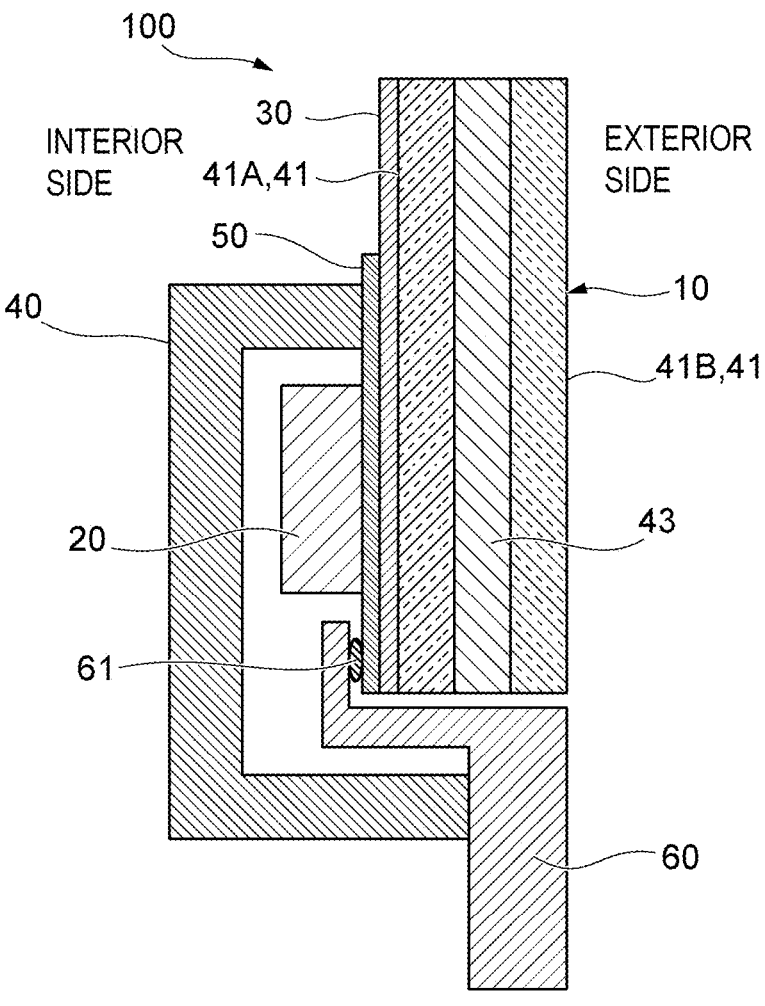
FIG. 9C is a schematic cross-sectional view illustrating a configuration of a glass vibration plate.

Each of FIGS. 9A to 9C is a schematic cross-sectional view of the vibration device 100 including the enclosure member 40 fixed to at least a part of the glass vibration plate 10. The vibrator 20 and the enclosure member 40 are fixed to a first glass plate 41A side (vehicle interior side) of the glass vibration plate 10 by an adhesive (not illustrated) or the like. In each of FIGS. 9A and 9B to be described later, the entire enclosure member 40 is fixed to the glass vibration plate 10, and in FIG. 9C, a part of the enclosure member 40 is fixed to the glass vibration plate 10.

FIG. 9A illustrates an example of the vibration device 100 in which the temperature adjustment unit 30 is disposed on a main surface on the vehicle interior side of the first glass plate 41A, and the vibrator 20 and the enclosure member 40 are attached to the temperature adjustment unit 30. The glass vibration plate 10 may be a side window capable of being raised and lowered among window glasses attached to a vehicle, or may be a fixed window glass such as a rear window.

FIG. 9B is an example of the vibration device 100 in which a shielding layer 50 disposed so as to overlap the vibrator 20 and the enclosure member 40 in a plan view of the glass plate 41 is provided, in contrast to FIG. 9A. In FIG. 9B, the shielding layer 50 is provided on a surface of the temperature adjustment unit 30 on the vehicle interior side, the present invention is not limited thereto, and the shielding layer 50 may be disposed on a main surface of the first glass plate 41A on the vehicle interior side, that is, between the first glass plate 41A and the temperature adjustment unit 30, between the first glass plate 41 and the intermediate layer 43, or between the intermediate layer 43 and the second glass plate 41B.

The shielding layer 50 is a non-transparent layer, for example, is provided in a band shape along a peripheral edge portion in the plan view of the glass plate 41, and may be provided in a part of the peripheral edge, that is, a portion in which the vibrator 20 and the enclosure member 40 are disposed. The shielding layer 50 can be exemplified by a layer made of non-transparent colored ceramics, and black ceramics can be used. The shielding layer 50 can be formed by, for example, applying a ceramic color paste containing a meltable glass frit containing a black pigment onto the glass plate 41 by screen printing or the like and firing the applied ceramic color paste, and the shielding layer 50 is not limited thereto. The shielding layer 50 may be formed by applying organic ink containing a black or dark pigment onto the glass plate 41 by screen printing or the like and drying the applied organic ink. The vibration device 100 illustrated in FIG. 9B includes the shielding layer 50, and thus the vibrator 20 and the enclosure member 40 are less likely to be visually recognized, and the appearance is improved.

FIG. 9C is an example of the vibration device 100 in which a part of the enclosure member 40 is fixed to a vehicle body 60, in contrast to FIG. 9B. In FIG. 9C, the glass plate 41 is a fixed window for the vehicle. The vehicle body 60 may be a metal flange or an interior member fixed to the metal flange. The glass vibration plate 10 and the vehicle body 60 are fixed to each other by an adhesive 61 disposed on a peripheral edge portion. Examples of the adhesive 61 include, but are not limited to, urethane resin (urethane adhesive). In the vibration device 100 illustrated in FIG. 9C, by fixing a part of the enclosure member 40 to the vehicle body 60, the vibrator 20 and the enclosure member 40 can be disposed at the peripheral edge portion of the glass plate 41, and thus an area of the opening (transmission region) of the window glass can be increased.

Each of FIGS. 10A to 10F is a schematic plan view of the vibration device 100 including the enclosure member 40 fixed to the glass vibration plate 10. The glass vibration plate 10 illustrated in each of FIGS. 10A to 10F is a fixed window glass, such as a rear window, in which an end (peripheral edge portion) of the glass vibration plate 10 is fixed to the vehicle body 60. In each of FIGS. 10A to 10F, the shielding layer 50 is omitted, and when the shielding layer 50 is provided, the shielding layer 50 may be disposed so as to overlap the vibrator 20 and the enclosure member 40 in the plan view of the glass vibration plate 10 (glass plate 41). In addition, in each of the examples illustrated in FIGS. 10A to 10F, four or two vibrators 20 are disposed, and the number of vibrators 20 to be disposed can be determined without being limited to these.

Figure 10A:
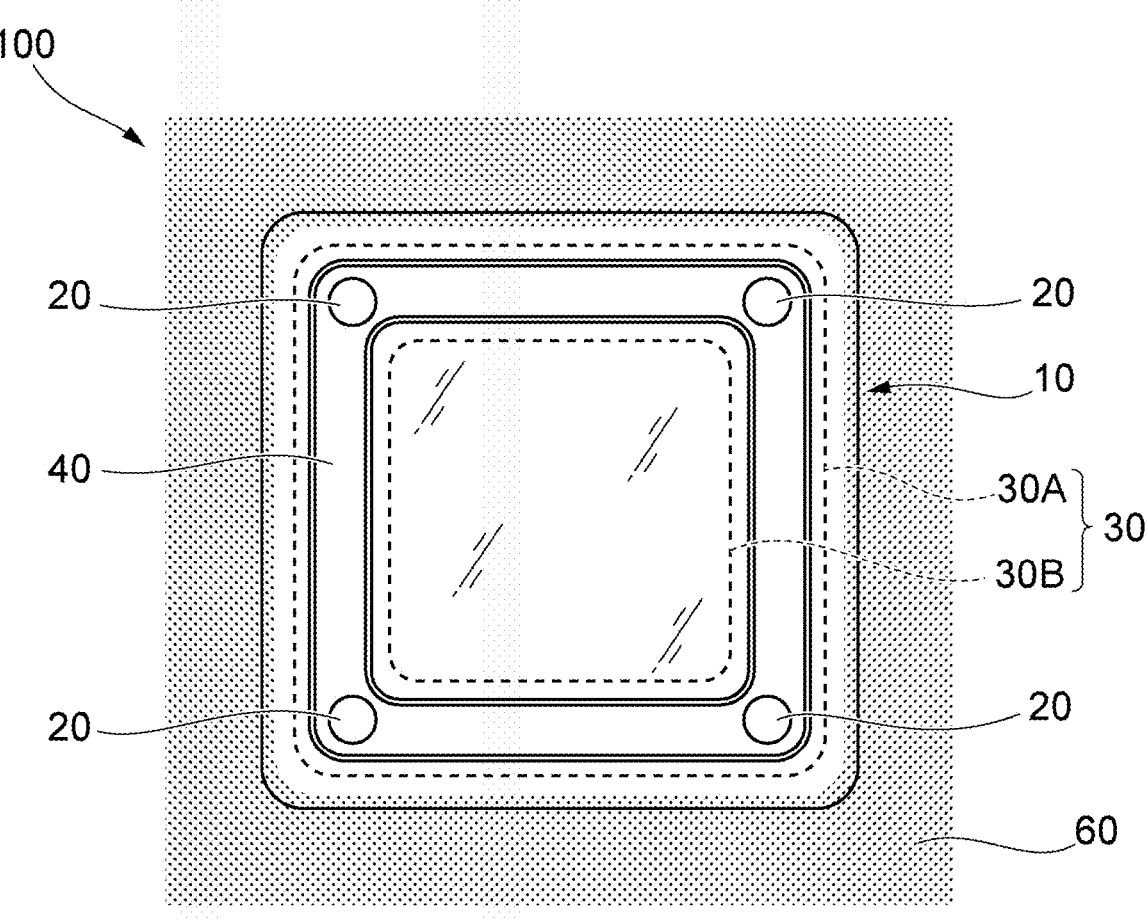
FIG. 10A is a plan view illustrating a configuration in which a glass vibration plate is attached to a vehicle body.

FIG. 10A illustrates an example of the vibration device 100 that includes the glass vibration plate 10 in which (a total of four) vibrators 20 are disposed at four corners having a substantially rectangular shape in the plan view of the glass vibration plate 10 (glass plate 41), and in which the enclosure member 40 with which the vibrators 20 are covered is attached to the peripheral edge portion of the glass vibration plate 10. In the vibration device 100 illustrated in FIG. 10A, the temperature adjustment unit 30 has an annular shape, and has a region surrounded by an outer edge 30A of the temperature adjustment unit 30 and an inner edge 30B of the temperature adjustment unit 30, and the vibrator 20 is disposed in the region. In addition, the region of the temperature adjustment unit 30 illustrated in FIG. 10A may be wider or narrower than the enclosure member 40, or may have the same width as the enclosure member 40, and may have a portion that does not overlap the enclosure member 40.

Figure 10B:
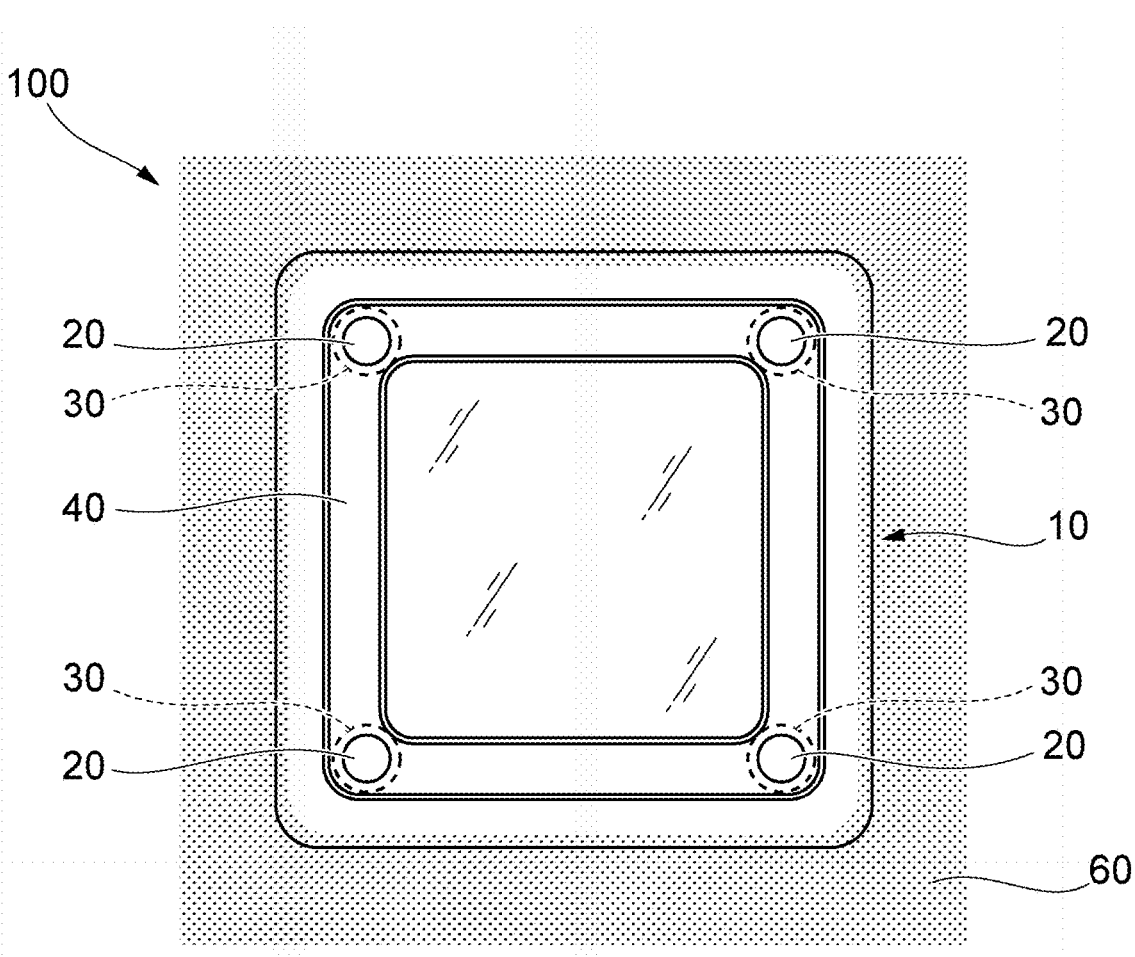
FIG. 10B is a plan view illustrating a configuration in which a glass vibration plate is attached to the vehicle body.

FIG. 10B is an example of the vibration device 100 in which the region of the temperature adjustment unit 30 is different from that in FIG. 10A. In FIG. 10B, a plurality of temperature adjustment units 30 corresponding to the respective vibrators 20 are provided, and in this case, four temperature adjustment units 30 separated from each other are provided. In FIG. 10B, the temperature adjustment units 30 are disposed so as to overlap all of the vibrators 20, and may be disposed so as to partially overlap the respective vibrators 20.

Figure 10C:
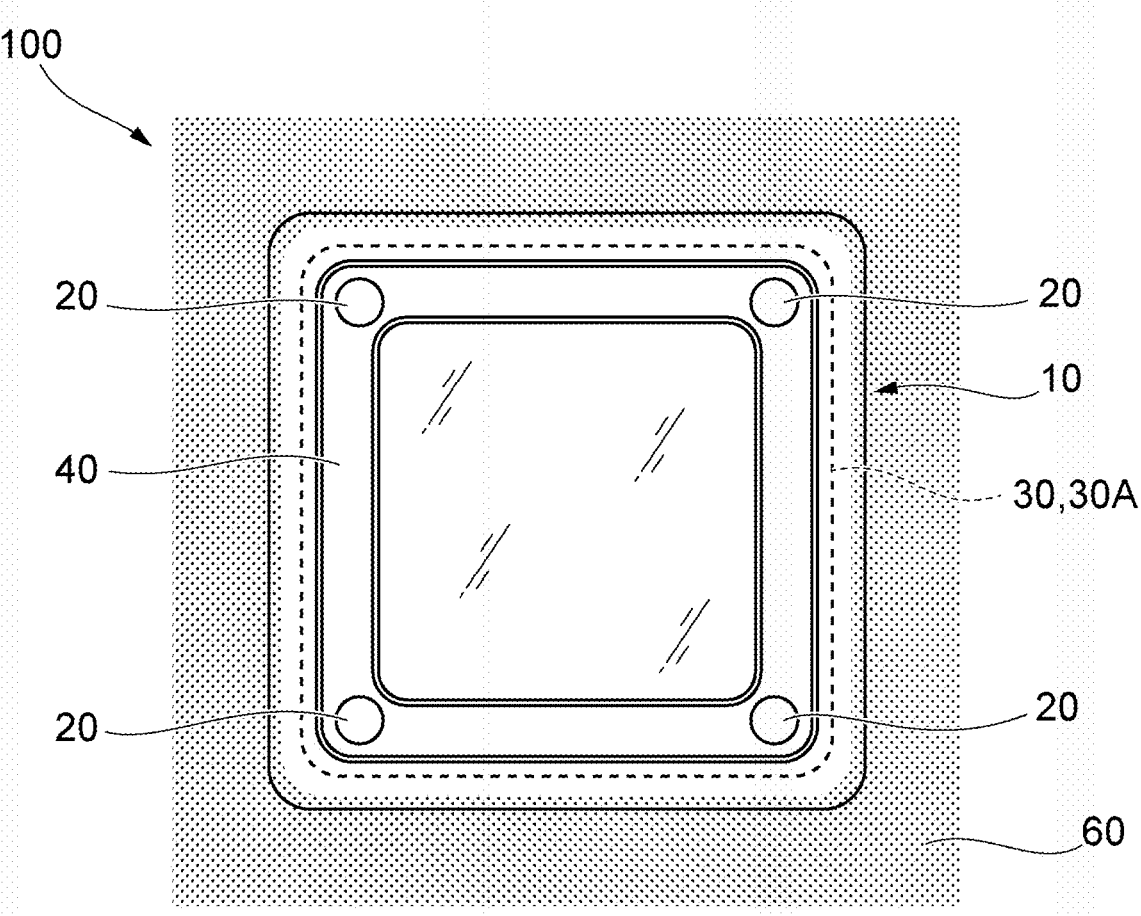
FIG. 10C is a plan view illustrating a configuration in which a glass vibration plate is attached to the vehicle body.

FIG. 10C is an example of the vibration device 100 in which the region of the temperature adjustment unit 30 is different from that in FIG. 10A. In FIG. 10C, the region of the temperature adjustment unit 30 has a substantially rectangular shape along an outer edge of the glass vibration plate 10. In FIG. 10C, the temperature adjustment unit 30 is disposed so as to overlap all of the vibrators 20 at the four corners, and may be disposed so as to partially overlap the vibrators 20. Further, the temperature adjustment unit 30 may be constituted by a member having a high visible light transmittance so as not to reduce a visible light transmittance of the opening of the glass vibration plate 10.

Figure 10D:
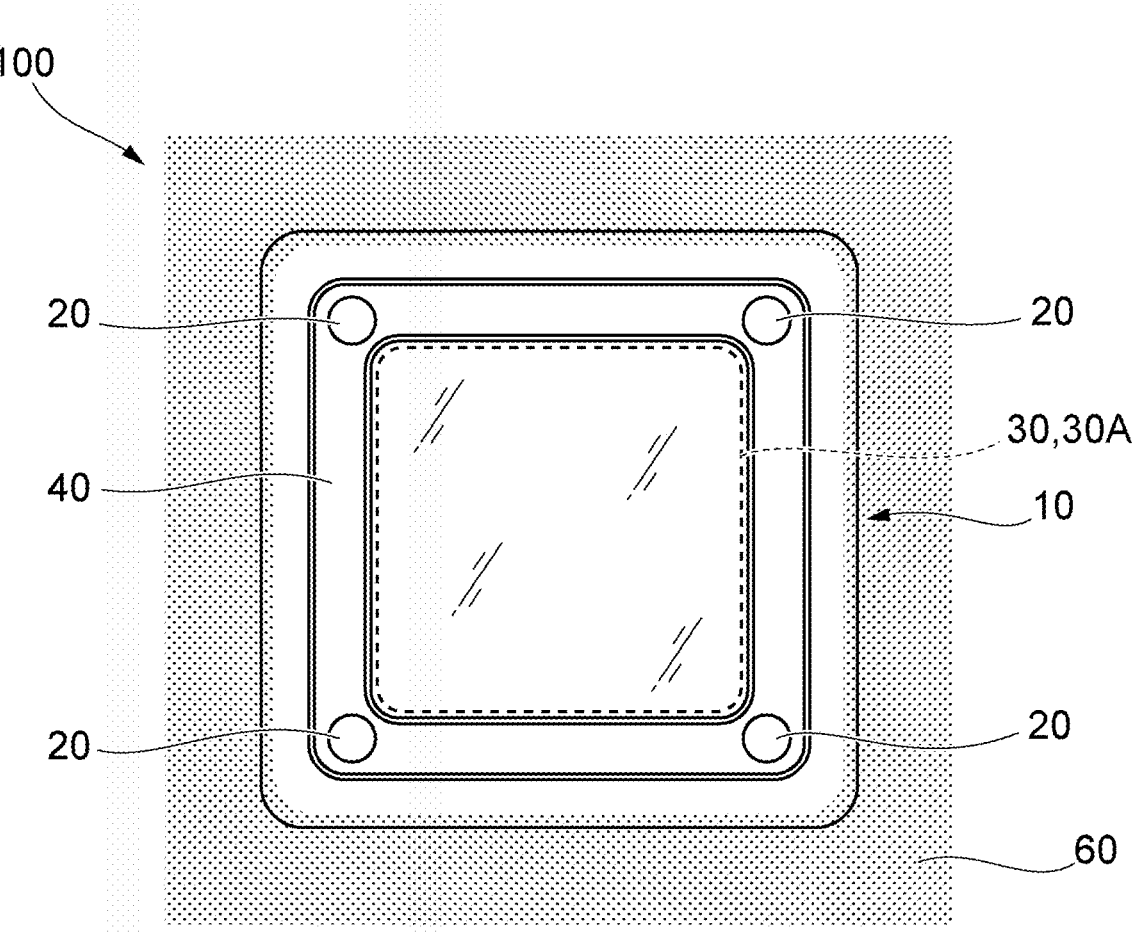
FIG. 10D is a plan view illustrating a configuration in which a glass vibration plate is attached to the vehicle body.

FIG. 10D is an example of the vibration device 100 in which the region of the temperature adjustment unit 30 is different from that in FIG. 10C. In FIG. 10D, the region of the temperature adjustment unit 30 in the plan view of the glass vibration plate 10 (glass plate 41) has a substantially rectangular shape along the outer edge of the glass vibration plate 10, and does not overlap the vibrators 20 at the four corners. In addition, in FIG. 10D, the temperature adjustment unit 30 is disposed so as not to overlap the enclosure member 40, and may be disposed so as to overlap a part of the enclosure member 40.

Figure 10E:
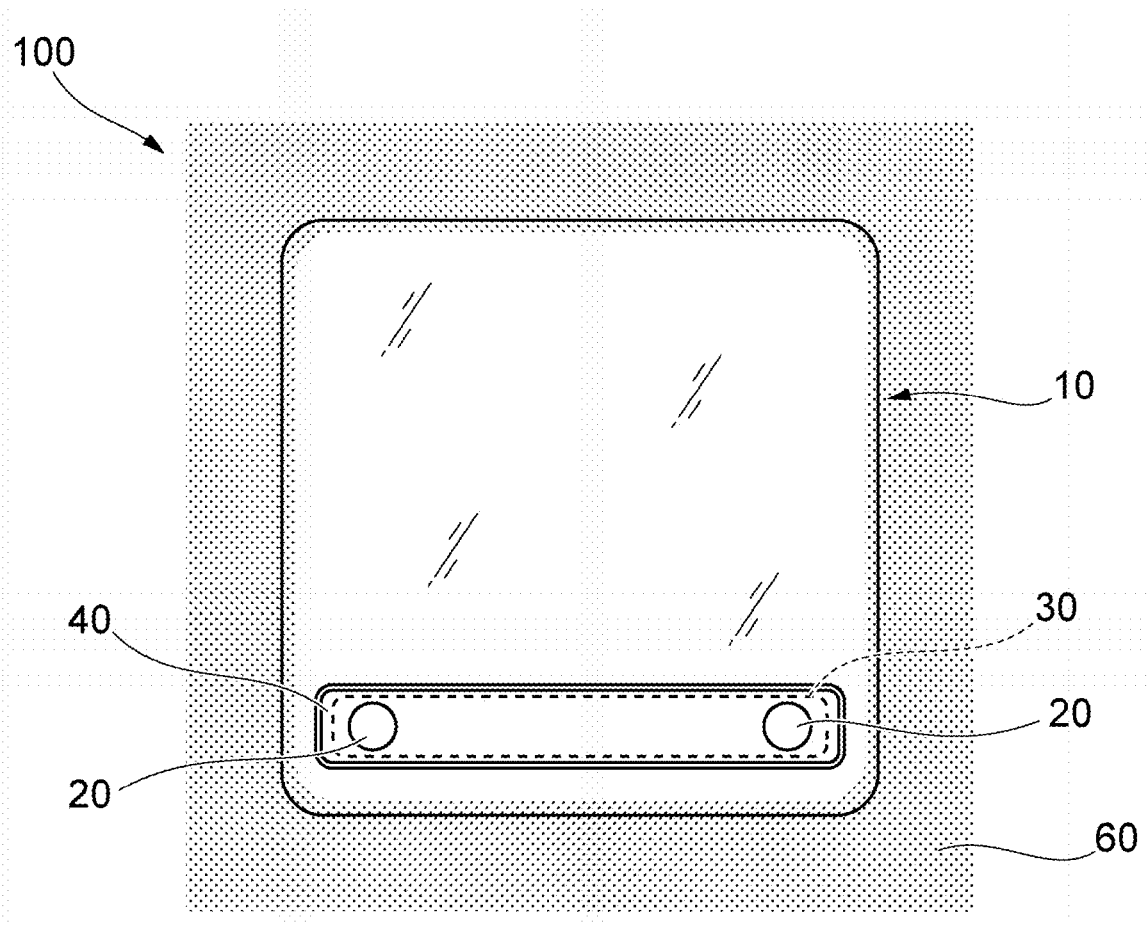
FIG. 10E is a plan view illustrating a configuration in which a glass vibration plate is attached to the vehicle body.

FIG. 10E is an example of the vibration device 100 in which (a total of two) vibrators are disposed at two adjacent corners of the substantially rectangular glass vibration plate 10, that is, at both ends of any one side in the plan view of the glass vibration plate 10 (glass plate 41), in contrast to FIG. 10A. In FIG. 10E, the enclosure member 40 is attached to the glass plate 41 along one side on which the two vibrators 20 are arranged. In addition, in FIG. 10E, the temperature adjustment unit 30 is disposed along one side on which the two vibrators 20 are arranged so as to overlap all of the vibrators 20, and may be disposed so as to partially overlap the vibrators 20. For example, in a case in which the glass vibration plate 10 is attached as a rear glass of the vehicle, the "any one side" referred to herein may be one side along a roof of the vehicle (in a horizontal direction of the vehicle).

Figure 10F:
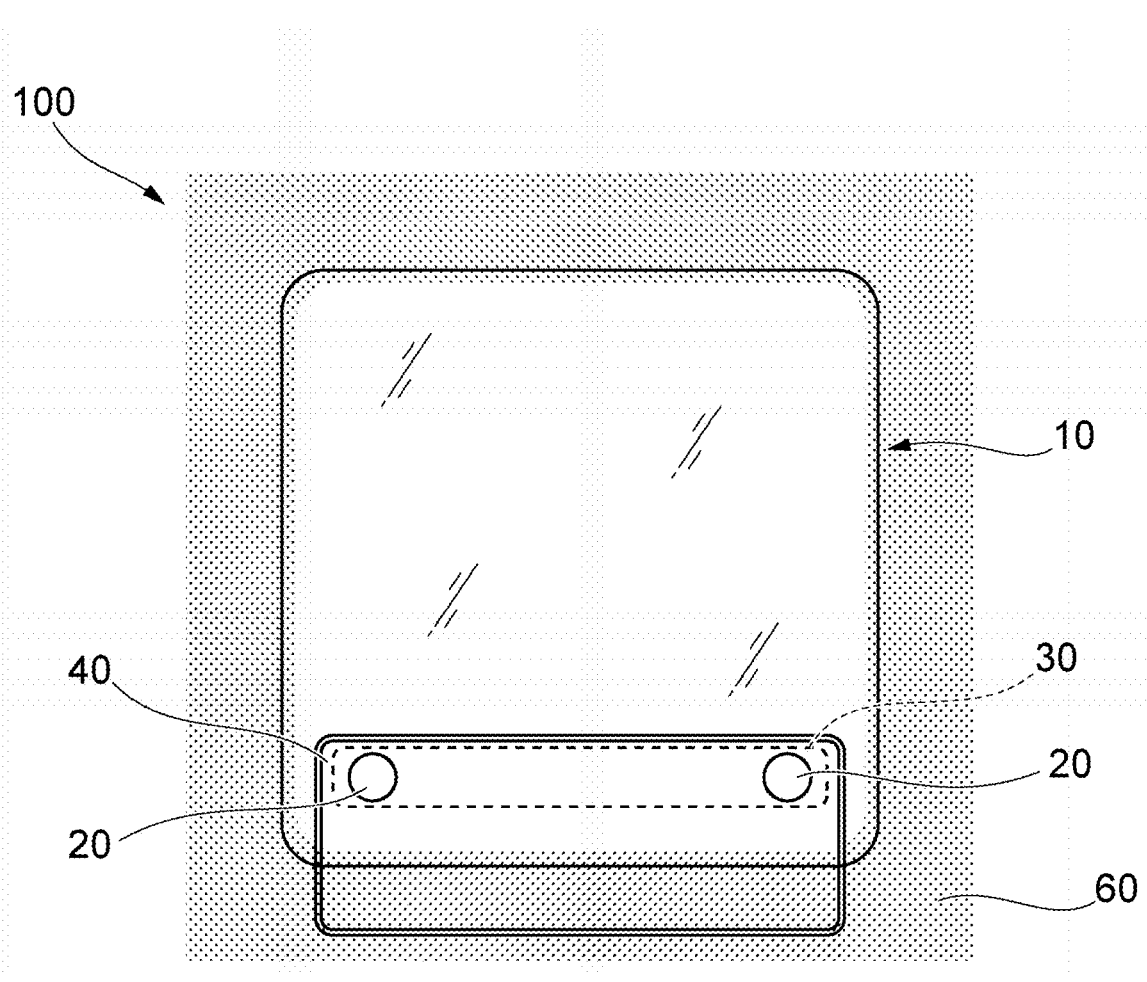
FIG. 10F is a plan view illustrating a configuration in which a glass vibration plate is attached to the vehicle body.

FIG. 10F is an example of the vibration device 100 in which the enclosure member is disposed on both the glass vibration plate 10 and the vehicle body 60, in contrast to FIG. 10E. In the example of FIG. 10F, for example, the vibration device 100 in FIG. 9C described above can be referred to as a cross-sectional structure, and the enclosure member 40 is fixed to both the glass vibration plate 10 and the vehicle body 60.

Examples of the configuration of the temperature adjustment unit 30 include the heating body, and a material or a structure having a heat retention function. In the case of heating, the intermediate layer 43 is heated using the heating body such as a heat ray, a conductive film, and an electronic device, and in the case of performing heat retention, the intermediate layer 43 is made to follow the vehicle interior temperature. In addition, in the case of cooling, an electronic cooling element such as a Peltier element can be used. When the Peltier element is used, heating and cooling can be selectively performed, and a temperature adjustment range is expanded.

Specific examples of the heating body include a conductive wire, a transparent conductive film (ITO), and a film heater. The conductive wire is a heat ray heater, and can be disposed in each region, such as the entire surface of the glass plate or only the excitation region below the belt line BL. Each of the transparent conductive film and the film heater is a planar heater having a heating surface, can be disposed in each region similar to the case of the conductive wire, and can efficiently heat a wide area. In addition, the Peltier element can be disposed only in the excitation region A1 below the belt line BL. By providing the heating body on both surfaces of the glass vibration plate, a responsiveness of temperature adjustment can be improved.

In the case of performing heat retention, a configuration in which the heat insulating layer is provided on the glass plate and a configuration in which the plate thickness of the glass plate is reduced to increase a heat transfer rate to the intermediate layer 43 can be exemplified.

Figure 11:
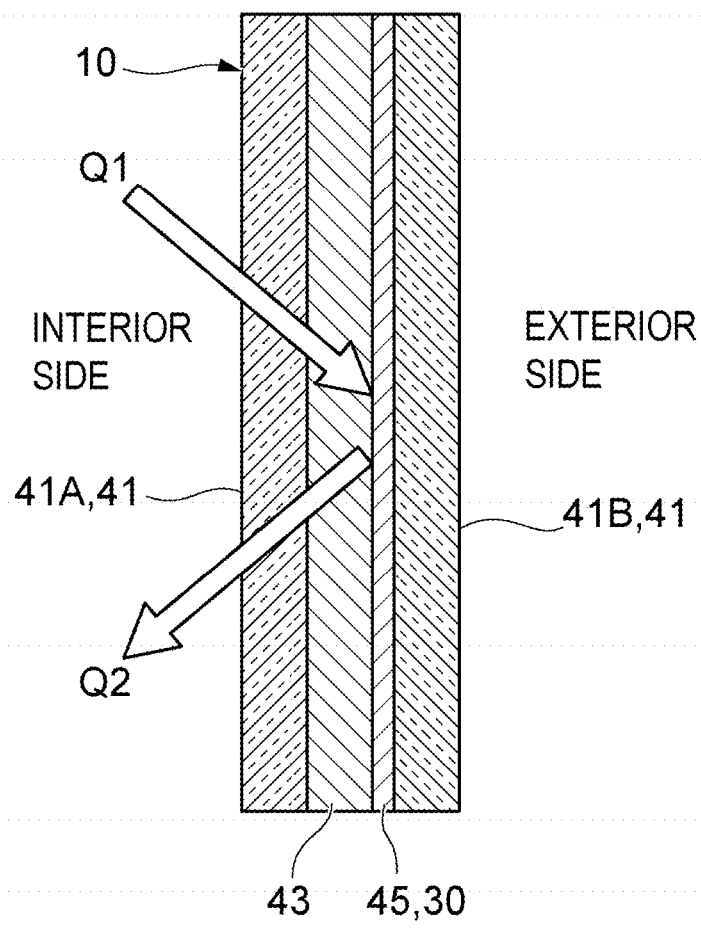
FIG. 11 is a partial cross-sectional view illustrating a configuration in which a heat ray reflective layer is provided on a glass vibration plate.

FIG. 11 is a partial cross-sectional view illustrating a configuration in which a heat ray reflective layer is provided on the glass vibration plate.

In the glass vibration plate 10 illustrated in FIG. 11, a heat ray reflective layer 45 is provided between the intermediate layer 43 and the second glass plate 41B. The heat ray reflective layer 45 plays a role of preventing a heat input Q1 introduced from the interior side through the first glass plate 41A and the intermediate layer 43 from escaping to the exterior side and returning the heat to the interior side again as reflected heat Q2. Accordingly, the intermediate layer 43 can be efficiently kept warm by the heat of the interior side. The heat ray reflective layer 45 can be formed by coating with a reflective film material such as an ITO film and an FTO film.

The heat ray reflective layer 45 functions as a heat insulating layer that prevents the heat input Q1 introduced into the intermediate layer 43 from escaping to the exterior side. Another example of such a heat insulating layer is an air layer. In this way, the heat insulating layer such as the heat ray reflective layer 45 serves as the temperature adjustment unit 30 that adjusts the temperature of the intermediate layer 43 using an atmospheric temperature on the interior side.

Figure 12:
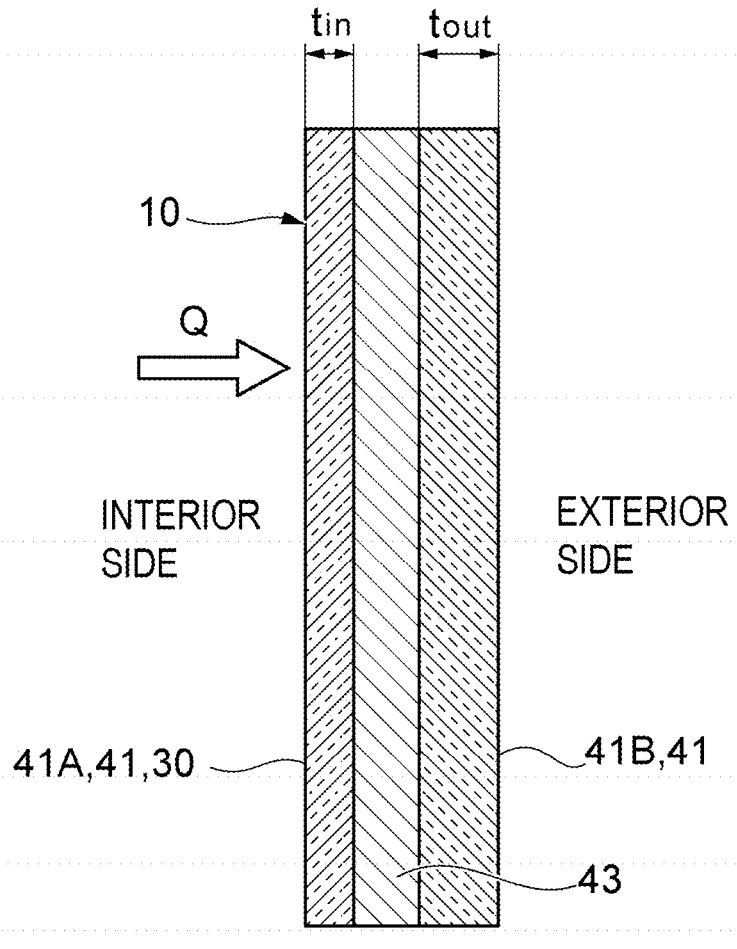
FIG. 12 is a partial cross-sectional view illustrating a configuration in which a plate thickness of one glass plate is smaller than a plate thickness of the other glass plate of a glass vibration plate.

FIG. 12 is a partial cross-sectional view illustrating a configuration in which the plate thickness of one glass plate is smaller than the plate thickness of the other glass plate of the glass vibration plate.

In the glass vibration plate 10 illustrated in FIG. 12, a plate thickness $t_{in}$ of the first glass plate 41A on the interior side is smaller than a plate thickness t out of the second glass plate 41B on the exterior side ($t_{in} < t_{out}$).

According to the configuration, when a heat quantity Q on the interior side is introduced into the intermediate layer 43 through the first glass plate 41A, the first glass plate 41A is thin, and thus the heat absorption by the first glass plate 41A is reduced, and an amount of a heat input to the intermediate layer 43 increases. When $t_{in} = \alpha t_{out}$, a coefficient $\alpha$ can be set in a range of $0 < \alpha < 1$, preferably $0.2 \leq \alpha \leq 0.8$, and more preferably $0.5 \leq \alpha \leq 0.7$.

That is, according to the configuration, the temperature of the intermediate layer 43 can follow a temperature of the interior side of the vehicle S in a short time. When the outside air temperature is low, the intermediate layer 43 is heated using the heat quantity Q of an interior temperature higher than the outside air temperature, and when the outside air temperature is high, the temperature of the intermediate layer 43 is brought close to the interior temperature lower than the outside air temperature. That is, the intermediate layer 43 is easily affected by the interior temperature. In this way, a combination of the first glass plate 41A and the second glass plate 41B each having an optimized plate thickness configuration functions as the temperature adjustment unit 30.

Figure 13:
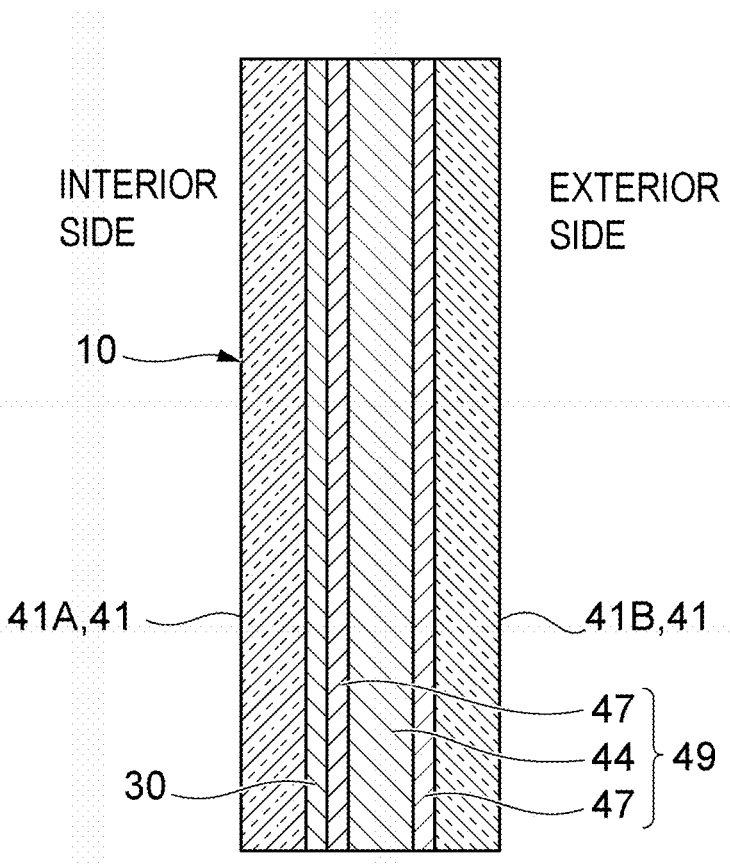
FIG. 13 is a cross-sectional view illustrating another configuration example of a glass vibration plate.

FIG. 13 is a cross-sectional view illustrating another configuration example of the glass vibration plate.

In the glass vibration plate 10 illustrated in FIG. 13, a layer of the temperature adjustment unit 30 is provided on an inner side surface of the first glass plate 41A, resin layers 47 are provided between the layer of the temperature adjustment unit 30 and the second glass plate 41B, and further a fluid layer 44 made of a gel material or a liquid phase (for example, liquid crystal) is provided between the resin layers 47. The pair of resin layers 47 may be formed of a resin film that seals the fluid layer 44. The fluid layer 44 and the pair of resin layers 47 constitute an intermediate layer 49.

However, similar to the solid-phase intermediate layer 43, a damping performance of the vibration of the resin film decreases at a low temperature, and the resonance is likely to occur. In addition, when the temperature rises to the room temperature or higher (for example, 40° C. or higher), the damping characteristics are improved. Therefore, the glass vibration plate also includes the temperature adjustment unit 30, thereby increasing the damping performance of the resin layer 47 and enabling efficient excitation of the glass vibration plate 10.

The glass vibration plate 10 described above is not limited to application to the side window of the vehicle S illustrated in FIG. 1.

Figure 14:
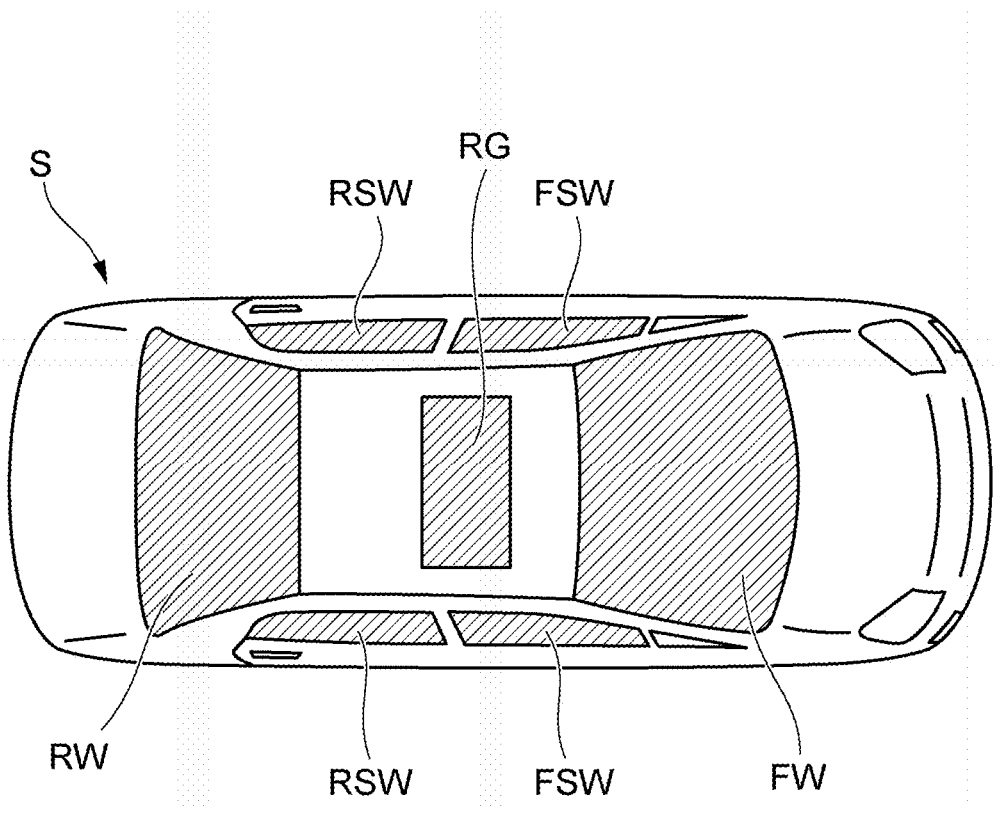
FIG. 14 is a plan view of a vehicle illustrating places at which glass vibration plates can be applied to a vehicle.

FIG. 14 is a plan view of the vehicle illustrating places at which the glass vibration plates 10 can be applied to the vehicle.

As illustrated in FIG. 14, the glass vibration plates 10 may be provided in rear side windows RSW, a front window FW, a rear window RW, a roof glazing RG, and the like in addition to front side windows FSW.

The glass vibration plates 10, and the exterior sound detection unit 11, the interior sound detection unit 13, and the control unit 15 illustrated in FIG. 1 constitute the sound insulation device 200.

The application of the glass vibration plate 10 to the vehicle S is not limited to the sound insulation, and the glass vibration plate 10 may be used as a window for a vehicle, a structural member, and a decorative panel in which water repellency, snow adhesion resistance, ice adhesion resistance, and antifouling properties are improved by the sound wave vibration. Specifically, the glass vibration plate 10 can be used as a lens, a sensor, and cover glasses thereof in addition to an automotive window glass, a mirror, and a plate-shaped member having a flat plate shape or a curved surface shape which is mounted in a vehicle. In addition, the glass vibration plate 10 can be used as a vehicle exterior speaker for the purpose of emitting a sound to the outside of the vehicle.

The sound insulation device 200 can be applied to a railway vehicle other than the above-described automobile, and can also be applied to, for example, a window of an aircraft, a window of a ship or the like, and a window of a building such as a housing, in addition to the vehicle S.

Figure 15:
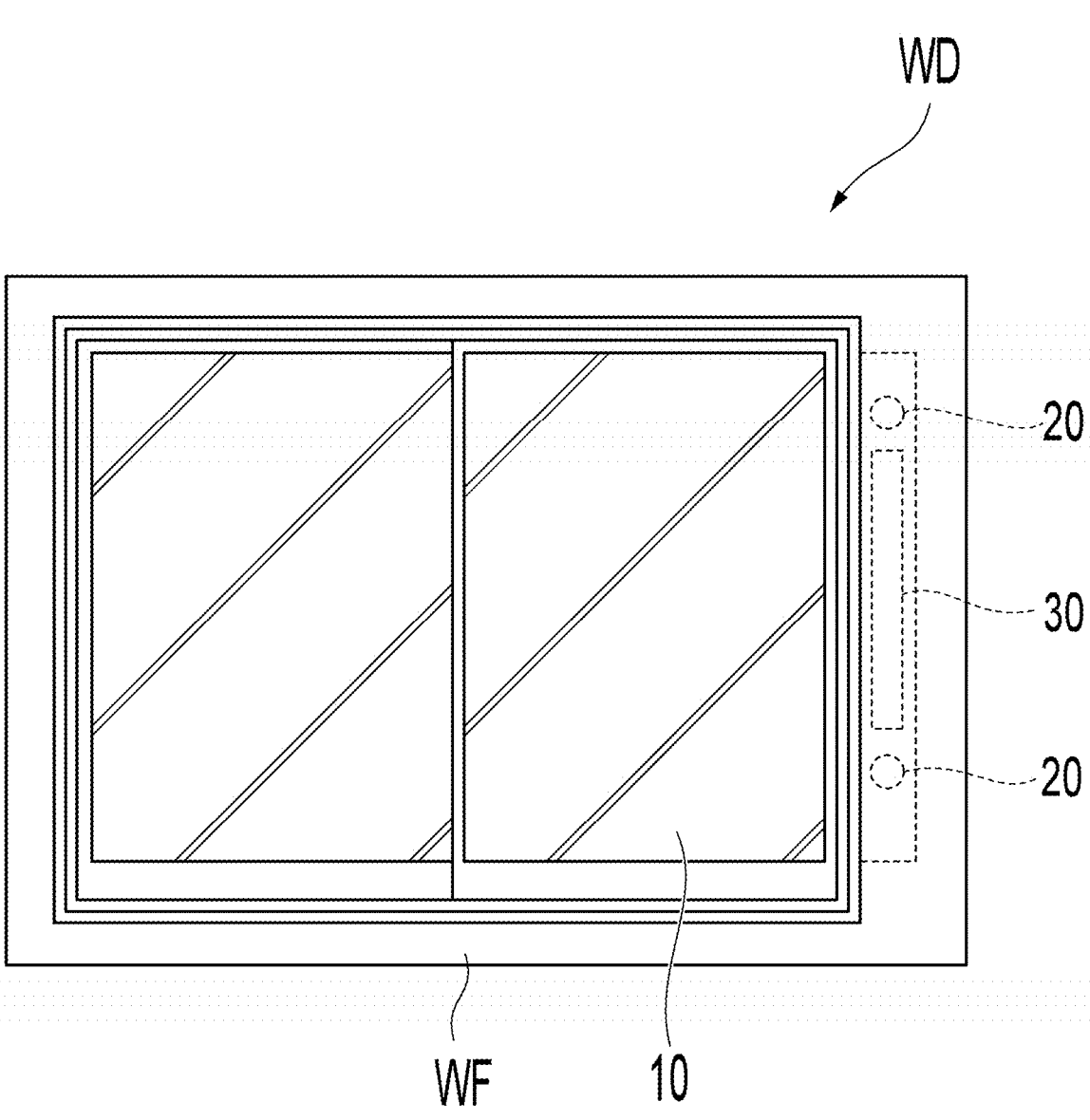
FIG. 15 is a schematic view illustrating an example in which a glass vibration plate is applied to a window of a housing.

FIG. 15 is a schematic view illustrating an example in which the glass vibration plate is applied to the window of the housing.

As illustrated in FIG. 15, the glass vibration plate 10 and a window frame WF for supporting the glass vibration plate 10 are provided in a window WD of the housing. The vibrator 20 is attached to a portion of the surface of the glass vibration plate 10 that is disposed in an internal space of the window frame WF. The number of vibrators 20 may be one or more. In addition, the temperature adjustment unit 30 is attached to at least a part of the glass vibration plate 10. The temperature adjustment unit 30 is preferably provided in the internal space of the window frame WF as illustrated in FIG. 8A, and the temperature adjustment region F may be appropriately changed as illustrated in each of FIGS. 8B to 8D.

In this way, if the sound insulation device 200 including the glass vibration plate 10 is applied to the window WD of the housing, the glass vibration plate 10 whose temperature is adjusted by the temperature adjustment unit 30 can be vibrated by the vibrator 20, and the transmission of a sound from the exterior to the interior can be stably reduced regardless of the outside air temperature.

Functions such as IR cut, UV cut, and coloring can be imparted to the glass vibration plate 10. Accordingly, the glass vibration plate 10 can be constituted with enhanced functionality according to the application.

Examples of application of the vibration device 100 to the building include a window glass, a door glass, a roof glass, an interior material, an exterior material, a decorative material, a structural material, an outer wall, and a cover glass for a solar cell. Furthermore, the vibration device 100 can be used as a partition, a dresser, or the like in a bank, a hospital, a hotel, a restaurant, an office, and the like. These components may function as an acoustic reflection (reverberation) plate or a sound absorption panel. In addition, the water repellency, the snow adhesion resistance, and the antifouling properties of the glass vibration plate 10 can also be improved by the sound wave vibration.

The internal space 23 provided in the enclosure member 40 may be provided, for example, in another portion such as the vehicle body in addition to a door panel of the vehicle, or may be provided in a sash member, a wall portion, and the like in a building member.

In addition to a window of a moving body such as a vehicle and the window of the building, the vibration device 100 described above can be used to, for example, a full range speaker, a bass reproduction speaker in a band of 15 Hz to 200 Hz, a high-pitched reproduction speaker in a band of 10 kHz to 100 kHz, a large speaker of which an area of a vibration plate is 0.2 m $^2$ or more, a planar speaker, a cylindrical speaker, a transparent speaker, a cover glass for a mobile device which functions as a speaker, a cover glass for a TV display, a screen film, a display in which a video signal and an audio signal are generated from the same surface, a speaker for a wearable display, an electric display, and a lighting fixture, as an electronic device member. These speakers may be for music or an alarm sound. In addition, by adding a vibration detection element such as an acceleration sensor, the vibration device 100 can also be used as a vibration plate for a microphone or a vibration sensor.

Glass Plate

Here, the glass plates 41 used for the glass vibration plate 10 mean an inorganic glass and an organic glass. Examples of the organic glass include a PMMA resin, a PC resin, a PS resin, a PET resin, and a cellulose resin, which are generally well known as a transparent resin.

In addition to the pair of glass plates 41 sandwiching the intermediate layer 43, another glass plate may be further laminated. The other glass plate may be the inorganic glass or the organic glass, and in place of the other glass plate, various plates such as a resin plate made of a resin, other than the organic glass, a metal plate such as aluminum, and a ceramic plate made of ceramic may be used. Specifically, examples of a material of the metal plate used in place of the other glass plate include aluminum, magnesium, copper, silver, gold, iron, titanium, and SUS, and other alloy materials and the like may be used as necessary.

As the ceramic material, for example, ceramics such as $Al_2O_3$, SiC, $Si_3N_4$, AlN, mullite, zirconia, yttria, and YAG, and a single crystal material can be used. The ceramic material is preferably a material having a light-transmitting property.

A physically strengthened glass plate or a chemically strengthened glass plate can also be used as at least one of the glass plates constituting the glass vibration plate 10. This is useful for preventing the glass plate from breaking. When an increase in strength of the glass plate is desired, it is preferable that the glass plate positioned on an outermost surface among the plurality of glass plates be the physically strengthened glass plate or the chemically strengthened glass plate, and it is more preferable that all the glass plates constituting the vibration device 100 be the physically strengthened glass plates or the chemically strengthened glass plates.

Using a crystallized glass or a phase-separated glass as the glass plate is also useful from the viewpoint of increasing the longitudinal wave sound velocity value and the strength. Especially when the increase in strength of the glass plate is desired, it is preferable that the glass plate positioned on the outermost surface among the plurality of glass plates be the crystallized glass or the phase-separated glass.

As the resin material constituting the glass plate, it is preferable to use a resin material that can be molded into a flat plate shape or a curved plate shape. In addition, as a composite material or a fiber material, it is preferable to use a resin material or a carbon fiber which is compounded with a high-hardness filler, a Kevlar fiber, and the like.

Compositions of the glass plate are not particularly limited, and are preferably, for example, within the following range. $SiO_2$: 40 mass % to 80 mass %, $Al_2O_3$: 0 mass % to 35 mass %, $B_2O_3$: 0 mass % to 15 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 20 mass %, $TiO_2$: 0 mass % to 10 mass %, and $ZrO_2$: 0 mass % to 10 mass %. The above-described compositions account for 95 mass % or more of the entire glass.

Compositions of the glass plate, which are displayed by mol % in terms of oxides, are more preferably within the following range.

$SiO_2$: 55 mass % to 75 mass %, $Al_2O_3$: 0 mass % to 25 mass %, $B_2O_3$: 0 mass % to 12 mass %, MgO: 0 mass % to 20 mass %, CaO: 0 mass % to 20 mass %, SrO: 0 mass % to 20 mass %, BaO: 0 mass % to 20 mass %, $Li_2O$: 0 mass % to 20 mass %, $Na_2O$: 0 mass % to 25 mass %, $K_2O$: 0 mass % to 15 mass %, $TiO_2$: 0 mass % to 5 mass %, and $ZrO_2$: 0 mass % to 5 mass %. The above-described compositions account for 95 mass % or more of the entire glass.

<Specific Configuration Example of Intermediate Layer>

The intermediate layer 43 between the plurality of glass plates 41 laminated on each other is preferably a solid phase, and may be a fluid layer made of a fluid such as a gel material or a liquid such as a liquid crystal between a pair of resin layers as described above.

(Solid-Phase Intermediate Layer)

Examples of the solid-phase intermediate layer 43 include polyvinyl butyral (PVB), an ethylene vinyl acetate copolymer resin (EVA), polyurethane, polyethylene terephthalate, and polycarbonate, which are suitably used as an intermediate film of laminated glass.

As described with reference to FIG. 11, in the case of the intermediate layer 49 containing a resin, when frequency characteristics differ depending on the temperature, this leads to disturbances in a sound pressure and a phase, and an active control performance is significantly reduced. The resin has a glass transition temperature, and the glass transition temperature of the resin material to be used is substantially low. That is, when the temperature is equal to or higher than the glass transition temperature, the frequency characteristics become good. However, when the temperature rises too much, the rigidity of the plate decreases, and efficient excitation cannot be applied.

Therefore, the temperature adjustment unit 30 can achieve the glass vibration plate 10 having good frequency characteristics by controlling the temperatures of the intermediate layers 43 and 49 to be equal to or higher than the glass transition temperature of the resin material and equal to or lower than 50° C., preferably equal to or lower than 45° C., and more preferably equal to or lower than 40° C.

(Fluid Layer)

The glass vibration plate 10 can achieve a high loss coefficient by providing a fluid layer containing a liquid in the intermediate layer between at least the pair of glass plates 41. In particular, the loss coefficient can be further increased by setting a viscosity and a surface tension of the fluid layer within a suitable range. This is considered to because, unlike a case in which the pair of glass plates 41 are provided with an adhesive layer interposed therebetween, the pair of glass plates 41 do not adhere to each other, and vibration characteristics of each glass plate 41 continue to be maintained. The term "fluid" as used in the present specification means all materials having fluidity and including liquids such as liquids, semi-solids, liquid crystals, mixtures of solid powders and liquids, and solid gels (jelly substances) impregnated with liquids.

The fluid layer preferably has a viscosity coefficient at 25° C. of $1 \times 10^{-2}$ Pa·s to $1 \times 10^3$ Pa·s and a surface tension at 25° C. of 15 mN/m to 80 mN/m. In a case in which the viscosity is too low, the vibration is less likely to be transmitted, and in a case in which the viscosity is too high, the pair of glass plates 41 positioned on both sides of the fluid layer adhere to each other to exhibit a vibration behavior as the single glass plate 41, such that resonance vibration is less likely to be attenuated. In addition, in a case in which the surface tension is too low, an adhesion between the glass plates 41 is reduced, and the vibration is less likely to be transmitted. In a case in which the surface tension is too high, the pair of glass plates 41 positioned on both sides of the fluid layer are likely to adhere to each other to exhibit the vibration behavior as the single glass plate 41, such that the resonance vibration is less likely to be attenuated.

The viscosity coefficient of the fluid layer at 25° C. is more preferably $1 \times 10^{-3}$ Pa·s or more, and still more preferably $1 \times 10-2$ Pa·s or more. In addition, the viscosity coefficient is more preferably $1 \times 10^2$ Pa·s or less, and still more preferably $1 \times 10$ Pa·s or less. The surface tension of the fluid layer at 25° C. is more preferably 20 mN/m or more, and still more preferably mN/m or more.

The viscosity coefficient of the fluid layer can be measured by a rotational viscometer or the like. The surface tension of the fluid layer can be measured by a ring method or the like.

In a case in which a vapor pressure of the fluid layer is too high, the fluid layer may evaporate and fail to function as the glass vibration plate 10. Therefore, the vapor pressure of the fluid layer at 25° C. and 1 atm is preferably $1 \times 10^4$ Pa or less, more preferably $5 \times 10^3$ Pa or less, and still more preferably $1 \times 10^3$ Pa or less. In addition, in a case in which the vapor pressure is high, sealing or the like may be performed such that the fluid layer does not evaporate, whereas at this time, it is necessary to prevent the vibration of the glass vibration plate 10 from being disturbed by a sealing material.

The thinner the thickness of the fluid layer is, the more preferable it is from the viewpoint of maintaining high rigidity and transmitting vibration. Specifically, in a case in which the total thickness of the pair of glass plates 41 is 1 mm or less, the thickness of the fluid layer is preferably 1/10 or less, more preferably 1/20 or less, still more preferably 1/30 or less, even more preferably 1/50 or less, still even more preferably 1/70 or less, and particularly preferably 1/100 or less, of the total thickness of the pair of glass plates 41. In addition, in a case in which the total thickness of the pair of glass plates 41 is more than 1 mm, the thickness of the fluid layer is preferably 100 μm or less, more preferably 50 μm or less, still more preferably 30 μm or less, even more preferably 20 μm or less, still even more preferably 15 μm or less, and particularly preferably 10 μm or less. A lower limit of the thickness of the fluid layer is preferably 0.01 μm or more from the viewpoint of film formability and durability.

It is preferable that the fluid layer be chemically stable, and the fluid layer and the pair of glass plates 41 positioned on both sides of the fluid layer do not react with each other. The "chemically stable" means, for example, to undergo little degradation (deterioration) by light irradiation or not to cause solidification, vaporization, decomposition, discoloration, chemical reaction with a glass, and the like at least in a temperature region of −20° C. to 70° C.

Specific examples of a component of the fluid layer include water, oil, an organic solvent, a liquid polymer, an ionic liquid, and a mixture thereof. More specifically, examples thereof include propylene glycol, dipropylene glycol, tripropylene glycol, a straight silicone oil (a dimethyl silicone oil, a methylphenyl silicone oil, a methyl hydrogen silicone oil), a modified silicone oil, an acrylic acid-based polymer, liquid polybutadiene, a glycerin paste, a fluorine-based solvent, a fluorine-based resin, acetone, ethanol, xylene, toluene, water, mineral oil, and a mixture thereof. In particular, it is preferable that at least one selected from the group consisting of propylene glycol, a dimethyl silicone oil, a methylphenyl silicone oil, a methyl hydrogen silicone oil, and a modified silicone oil be included, and it is more preferable that propylene glycol or a silicone oil be a main component.

In addition to the above, a slurry in which powders are dispersed can also be used as the fluid layer. From the viewpoint of improving the loss coefficient, although the fluid layer is preferably a uniform fluid, the slurry is effective in a case of imparting designability and functionality such as coloring and fluorescence to the glass vibration plate 10. A content of the powders in the fluid layer is preferably 0 volume % to 10 volume %, and more preferably 0 volume % to 5 volume %. From the viewpoint of preventing sedimentation, a particle diameter of the powder is preferably 10 nm to 1 μm, and more preferably 0.5 μm or less.

From the viewpoint of imparting designability and functionality, the fluid layer may contain a fluorescent material. In this case, the fluid layer may be a slurry fluid layer in which a fluorescent material is dispersed as powders, or a uniform fluid layer in which a fluorescent material is mixed as a liquid. Accordingly, an optical function such as light absorption and light emission can be imparted to the glass vibration plate 10.

As described above, the present invention is not limited to the embodiment described above, and combinations of the configurations in the embodiment with each other, modifications and applications by those skilled in the art based on the description of the specification and known techniques are also contemplated by the present invention and are included in the scope of protection.

As described above, the following matters are disclosed in the present specification.

(1) A vibration device including:

a glass vibration plate including a plurality of glass plates being laminated, and a solid-phase intermediate layer between at least a pair of the glass plates among the glass plates;

a vibrator fixed to the glass vibration plate and configured to vibrate the glass vibration plate; and an enclosure member configured to define an internal space surrounding the vibrator fixed to the glass vibration plate and cause one end of the glass vibration plate to be exposed outside the internal space from an opening of the internal space, in which the glass vibration plate includes a temperature adjustment unit configured to adjust a temperature of the intermediate layer.

According to the vibration device, by adjusting the temperature of the intermediate layer with the temperature adjustment unit, it is possible to reduce the influence of a temperature on a damping performance and frequency characteristics of the glass vibration plate, and to stably vibrate the glass vibration plate with required vibration characteristics.

(2) The vibration device according to (1), in which the temperature adjustment unit is provided in a region of a plate surface of the glass vibration plate, the region excluding a portion exposed to the outside from the internal space of the enclosure member.

According to the vibration device, the temperature adjustment unit cannot be visually recognized by the user, resulting in a good designability. Further, the temperature adjustment unit is prevented from being exposed to an environmental atmosphere.

(3) The vibration device according to (1) or (2), in which the temperature adjustment unit is provided in a region of a plate surface of the glass vibration plate, the region including at least a fixed position of the vibrator.

According to the vibration device, the vibrator and the temperature adjustment unit are arranged close to each other, and thus the vibration characteristics of the glass vibration plate by the vibrator can be reliably improved.

(4) The vibration device according to any one of (1) to (3), in which the temperature adjustment unit includes a heating body configured to heat the intermediate layer.

According to the vibration device, the temperature of the intermediate layer can be adjusted by heating with the temperature adjustment unit.

(5) The vibration device according to (4), in which the heating body is a heat ray heater or a planar heater having a planar heating surface.

According to the vibration device, even a wide area can be efficiently heated by the planar heater.

(6) The vibration device according to (4) or (5), in which the temperature adjustment unit is disposed on both surfaces of the glass vibration plate.

According to the vibration device, the temperature of the intermediate layer can be adjusted from both sides, and a responsiveness of the temperature adjustment is improved.

(7) The vibration device according to any one of (1) to (3), in which the temperature adjustment unit has a heat retention function for the intermediate layer.

According to the vibration device, the temperature of the intermediate layer can be adjusted by performing heat retention with the temperature adjustment unit. In addition, the temperature can be adjusted using an interior temperature.

(8) The vibration device according to (7), in which the temperature adjustment unit includes a heat insulating layer covering at least a part of the intermediate layer.

According to the vibration device, the heat insulating layer can reduce heat discharge and prevent a temperature decrease.

(9) The vibration device according to (8), in which the heat insulating layer is a heat ray reflective layer.

According to the vibration device, a heat retention efficiency of the intermediate layer is improved by the heat ray reflective layer.

(10) The vibration device according to (9), in which the heat ray reflective layer is provided on a surface of one of the pair of glass plates on a side of the intermediate layer.

According to the vibration device, heat is input to the intermediate layer from one glass plate side, and heat is also input from the heat ray reflective layer disposed on the other glass plate side.

(11) The vibration device according to (8), in which the temperature adjustment unit is configured to increase a heat input to the intermediate layer by making one of the pair of glass plates thinner than the other.

According to the vibration device, the heat absorption by the thin glass plate is decreased, and the heat input to the intermediate layer through the thin glass plate is increased. Accordingly, the heat can be taken into the intermediate layer without waste.

(12) The vibration device according to any one of (1) to (11), in which the intermediate layer is made of a resin material including any one of polyvinyl butyral, an ethylene vinyl acetate copolymer resin, polyurethane, polyethylene terephthalate, and polycarbonate.

According to the vibration device, the temperature is accurately adjusted by the temperature adjustment unit on the intermediate layer made of the resin material having a high temperature dependency of the frequency characteristics.

(13) The vibration device according to (12), in which the temperature adjustment unit is configured to adjust a temperature of the intermediate layer to a temperature equal to or higher than a glass transition temperature of the resin material and equal to or lower than 50° C.

According to the vibration device, the resonance due to the temperature of the glass vibration plate is reduced, and efficient excitation can be applied.

(14) The vibration device according to any one of (1) to (10), in which the intermediate layer includes a pair of resin films and a liquid layer or a gel layer sandwiched between the pair of resin films.

According to the vibration device, when one of the glass plates resonates, the resonance of the other glass plate can be further prevented by the liquid layer or the gel layer. In addition, the vibration caused by the resonance of the glass plates can be attenuated.

(15) The vibration device according to any one of (1) to (14), in which the glass vibration plate has a loss coefficient at 25° C. of $1\times10^{-3}$ or more, and has a longitudinal wave sound velocity value in a plate thickness direction at 25° C. of $4.0\times10^3$ m/s or more.

According to the vibration device, the vibration damping can be enhanced by increasing the loss coefficient, and the reproducibility of the sound in a high-frequency region can be improved by increasing the longitudinal wave sound velocity value.

(16) The vibration device according to any one of (1) to (15), in which at least a part of the enclosure member is fixed to the glass vibration plate.

According to the vibration device, the enclosure member can be stably fixed to the glass vibration plate, and the glass vibration plate can be stably vibrated with the required vibration characteristics.

(17) The vibration device according to (16), in which the glass vibration plate includes a shielding layer configured to shield visible light, and the shielding layer overlaps the vibrator and the enclosure member in a plan view of the glass vibration plate.

According to the vibration device, the appearance of the glass vibration plate can be improved.

(18) A sound insulation device including:

the vibration device according to any one of (1) to (17), the vibration device being disposed at a boundary between an interior space and an exterior;

an exterior sound detection unit configured to detect a sound from a noise source or a vibration source that is correlated with a sound wave vibration induced in the glass vibration plate, and output a reference signal according to a detection result;

an interior sound detection unit configured to detect a sound in the interior space and output an error signal according to a detection result; and a control unit configured to cause the vibrator to output a cancellation signal having a phase opposite to a phase of the reference signal.

According to the sound insulation device, by further adjusting the temperature of the intermediate layer with the temperature adjustment unit, the damping performance and the frequency characteristics of the glass vibration plate can be stabilized, and sound insulation characteristics can be improved. Further, by reducing the influence of the temperature change, it is possible to stably reduce the transmission of noise from the exterior to the interior, and it is possible to create a quiet and good interior environment.

(19) The sound insulation device according to (18), in which the enclosure member is a window frame member configured to support the glass vibration plate in a freely retractable manner.

According to the sound insulation device, when the glass vibration plate serving as a window glass is closed, the transmission of the noise from the exterior to the interior through the window can be stably reduced regardless of an environmental temperature.

(20) The sound insulation device according to (18) or (19), in which the glass vibration plate is at least one of a side window, a rear window, a front window, and a roof glazing of an automobile.

According to the sound insulation device, the inflow of noise from the glass vibration plate provided in the side window, the rear window, the front window, the roof glazing, and the like of the vehicle is less likely to be affected by the temperature, and the interior of the vehicle can be quiet.

(21) The sound insulation device according to (18) or (19), in which the glass vibration plate is a window of any one of a railway vehicle, an aircraft, a ship, and a building.

According to the sound insulation device, the inflow of noise from the glass vibration plate provided in the window of any one of the railway vehicle, the aircraft, the ship, and the building is less likely to be affected by the temperature, and the interior can be quiet.

The present application is based on Japanese Patent Application No. 2021-084927 filed on May 19, 2021, the contents of which are incorporated herein by reference.

REFERENCE SIGNS LIST

10: glass vibration plate
11, 11A, 11B, and 11C: exterior sound detection unit
13: interior sound detection unit
15: control unit
17: door panel
19: opening
20: vibrator
21: shielding member
23: internal space
25: support member
30: temperature adjustment unit
40: enclosure member
41: glass plate
41A: first glass plate
41B: second glass plate
43 and 49: intermediate layer
44: fluid layer
45: heat ray reflective layer
47: resin layer
50: shielding layer
60: vehicle body
61: adhesive
100: vibration device
200: sound insulation device
A1: excitation region
A2: vibration region
What is claimed is:

1. A vibration device comprising:
a glass vibration plate comprising a plurality of glass plates being laminated, and a solid-phase polymer resin intermediate layer between at least a pair of the glass plates among the glass plates;
a vibrator fixed to the glass vibration plate and configured to vibrate the glass vibration plate, wherein
the glass vibration plate comprises a temperature adjustment unit configured to adjust a temperature of the solid-phase polymer resin intermediate layer.

2. The vibration device according to claim 1, wherein the temperature adjustment unit performs heating, cooling, and heat-retention of the solid-phase polymer resin intermediate layer based on a temperature of the glass vibration plate, a surrounding member, or an environmental atmosphere.

3. The vibration device according to claim 1, wherein the temperature adjustment unit is provided in a region of a plate surface of the glass vibration plate, the region comprising at least a fixed position of the vibrator.

4. The vibration device according to claim 1, wherein the temperature adjustment unit comprises a heating body configured to heat the solid-phase polymer resin intermediate layer.

5. The vibration device according to claim 4, wherein the heating body is a heat ray heater or a planar heater having a planar heating surface.

6. The vibration device according to claim 4, wherein the temperature adjustment unit is disposed on both surfaces of the glass vibration plate.

7. The vibration device according to claim 1, wherein the temperature adjustment unit has a heat retention function for the solid-phase polymer resin intermediate layer.

8. The vibration device according to claim 7, wherein the temperature adjustment unit comprises a heat insulating layer covering at least a part of the solid-phase polymer resin intermediate layer.

9. The vibration device according to claim 8, wherein the heat insulating layer is a heat ray reflective layer.

10. The vibration device according to claim 9, wherein the heat ray reflective layer is provided on a surface of one of the pair of glass plates on a side of the solid-phase polymer resin intermediate layer.

11. The vibration device according to claim 8, wherein one of the pair of glass plates is thinner than the other.

12. The vibration device according to claim 1, wherein the solid-phase polymer resin intermediate layer is made of a resin material comprising any one of polyvinyl butyral, an ethylene vinyl acetate copolymer resin, polyurethane, polyethylene terephthalate, and polycarbonate.

13. The vibration device according to claim 12, wherein the temperature adjustment unit is configured to adjust a temperature of the solid-phase polymer resin intermediate layer to a temperature equal to or higher than a glass transition temperature of the resin material and equal to or lower than 50° C.

14. The vibration device according to claim 1, wherein the glass vibration plate is at least one of a side window, a rear window, a front window, and a roof glazing of an automobile.

15. The vibration device according to claim 1, wherein the glass vibration plate has a loss coefficient at 25° C. of $1\times10^{-3}$ or more, and has a longitudinal wave sound velocity value in a plate thickness direction at 25° C. of $4.0\times10^{3}$ m/s or more.

16. The vibration device according to claim 1, wherein at least a part of the enclosure member is fixed to the glass vibration plate.

17. The vibration device according to claim 16, wherein the glass vibration plate comprises a shielding layer configured to shield visible light, and
the shielding layer overlaps the vibrator and the enclosure member in a plan view of the glass vibration plate.

18. A sound insulation device comprising:
the vibration device according to claim 1, the vibration device being disposed at a boundary between an interior space and an exterior;
an exterior sound detection unit configured to detect a sound from a noise source or a vibration source that is correlated with a sound wave vibration induced in the glass vibration plate, and output a reference signal according to a detection result;
an interior sound detection unit configured to detect a sound in the interior space and output an error signal according to a detection result; and
a control unit configured to cause the vibrator to output a cancellation signal having a phase opposite to a phase of the reference signal.

19. The sound insulation device according to claim 18, wherein the enclosure member is a window frame member configured to support the glass vibration plate in a freely retractable manner.

20. The sound insulation device according to claim 18, wherein the glass vibration plate is at least one of a side window, a rear window, a front window, and a roof glazing of an automobile.

21. The vibration device according to claim 1, wherein:

the vibration device comprises a plurality of vibrators; and a plurality of temperature adjustment units, each corresponding to its respective vibrator.

\* \* \* \* \*